United States Patent
Murakawa

(10) Patent No.: US 6,463,432 B1
(45) Date of Patent: Oct. 8, 2002

(54) APPARATUS FOR AND METHOD OF RETRIEVING IMAGES

(75) Inventor: Akira Murakawa, Toyonaka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/365,184

(22) Filed: Aug. 2, 1999

(30) Foreign Application Priority Data

| Aug. 3, 1998 | (JP) | 10-218854 |
| Aug. 18, 1998 | (JP) | 10-231757 |
| Sep. 9, 1998 | (JP) | 10-255232 |

(51) Int. Cl.$^7$ .................. G06F 17/30; G06F 7/00
(52) U.S. Cl. .................. 707/5; 707/3; 382/299
(58) Field of Search .................. 382/159, 171, 382/190, 299; 707/1–6

(56) References Cited

U.S. PATENT DOCUMENTS

| 4,980,842 A | * 12/1990 | Kamada et al. | 710/130 |
| 5,161,204 A | * 11/1992 | Hutcheson et al. | 382/157 |
| 5,274,714 A | * 12/1993 | Hutcheson et al. | 382/157 |
| 5,465,308 A | * 11/1995 | Hutcheson et al. | 382/159 |
| 5,493,677 A | * 2/1996 | Balogh et al. | 707/104 |
| 5,502,576 A | * 3/1996 | Ramsay et al. | 358/444 |
| 5,572,726 A | * 11/1996 | Hasuo | 707/200 |
| 5,638,465 A | * 6/1997 | Sano et al. | 382/281 |
| 5,860,075 A | * 1/1999 | Hashizume et al. | 707/530 |
| 5,889,927 A | * 3/1999 | Suzuki | 358/1.2 |
| 5,893,095 A | * 4/1999 | Jain et al. | 707/6 |
| 5,911,139 A | * 6/1999 | Jain et al. | 707/3 |
| 5,913,205 A | * 6/1999 | Jain et al. | 707/2 |
| 5,915,250 A | * 6/1999 | Jain et al. | 707/100 |
| 5,945,982 A | * 8/1999 | Higashio et al. | 707/3 |
| 5,983,237 A | * 11/1999 | Jain et al. | 707/104 |
| 5,987,459 A | * 11/1999 | Swanson et al. | 707/6 |
| 6,008,807 A | * 12/1999 | Bretschneider et al. | 345/732 |
| 6,084,595 A | * 7/2000 | Bach et al. | 345/589 |
| 6,181,818 B1 | * 1/2001 | Sato et al. | 382/170 |

FOREIGN PATENT DOCUMENTS

| JP | 11085982 A | * 3/1999 | G06T/07/00 |
| JP | 110663310 A | * 3/1999 | G06T/07/00 |

OTHER PUBLICATIONS

Breitneder, C. and Eidenberger, H. "Automatic Query Generation for Content–Based Image Retrieval", IEEE Conference on Multimedia and Expo, Jul. 30—Aug. 2, 2000, vol. 2, pp. 705–708.*

Jacobs, C.E. et al. "Fast Multiresolution Image Querying", Proceedings of the International Conference on Computer Graphics and Interactive Techniques, 1995, pp. 277–286.*

* cited by examiner

Primary Examiner—Jean R. Homere
Assistant Examiner—Luke S Wassum
(74) Attorney, Agent, or Firm—McDermott, Will & Emery

(57) ABSTRACT

In order to retrieve images similar to a key image out of objective images, feature values of the key image and feature values of each objective image are obtained. On the basis of the feature values of the key image, weighting factors corresponding to types of the feature values are obtained. From the feature values of the key image and the each objective image, similarity values corresponding to types of the feature values are obtained. Further, a total similarity value is obtained on the basis of the similarity values and the weighting factors. The images similar to the key image are retrieved in accordance with the total similarity values of the objective images.

16 Claims, 22 Drawing Sheets

APPARATUS FOR AND METHOD OF RETRIEVING IMAGES

This application is based on application Nos. 10-218854, 10-231757 and 10-255232 filed in Japan, the contents of which are hereby incorporated by reference.

BACKGROUND OF THE INVENTION

1. Field of the Invention

The present invention relates to a technique of comparing an image with another image, and more particularly to a technique of retrieving an image similar to a specified image (hereinafter referred to as "key image") from a plurality of images stored in a database to be searched. Further, the present invention relates to a technique of sequentially displaying a plurality of images while searching.

2. Description of the Background Art

With recent remarkable development in information processing and in particular, improvement in performance of personal computer, image database apparatus, electronic filing apparatus and the like become widespread for general user (consumer) as well as specific application such as business area. The image database apparatus and the electronic filing apparatus capture images and documents through an input device and store the captured data associated with added information such as keyword into a database as image data or document data, manage the database, search the database for images or documents as required and display or print the retrieved data on an output device.

Without appropriate added information such as keyword associated with the image data in the image database storing a large amount of data, however, an effective search is impossible and hence difficulty in quick retrieval of a desired image results in poor practicality.

In such a search for images, one of techniques for searching a database storing a plurality of images for an image similar to a key image adopts a method of comparing feature values representing features of images. There are various types of feature values. For example, as the feature values of color and texture, chromaticness (saturation) and the edge intensity are obtained, respectively, and an image having values close to those of the key image is retrieved from a plurality of images. As to this technique, for example, a retrieval software of Exculibur named as "Visual RetrievalWare" and a retrieval software of Virage named as "VIR Image Engine" are well known.

In these well-known similar-image retrieval technique, a fixed default value or a user-set value is used as a weighting factor for each feature value and a comparison is made on the basis of the weighting factor for each feature value. If a search is made with the weighting factor for a feature value increased or decreased and the search result is unsatisfactory, a further search is required with the weighting factor for another feature value increased or decreased.

For this reason, in order to perform a search for a desired image, it is desirable for a user to know in advance which feature value of the key image should be emphasized in the search (in other words, which feature value is given a large weighting factor).

Further, these well-known similar-image retrieval technique do not consider resolution of the images to be compared with each other. It is obvious that feature values of an image to be extracted change with variation of its resolution. For example, in an image with high resolution, fine edges are clearer and the feature value of texture is larger. Various colors are found independently in an image with high resolution while mixed in that with low resolution, and the images with high resolution and low resolution have different feature values of each color.

When an image search is performed while the key image and an image to be compared are displayed on a screen for observation, these images are reduced by limitation of the size of the screen to have lower resolution in some cases. Even in this situation, a similar-image retrieval with resolution of original image is required in some cases and a similar-image retrieval with impression of the image on the browser is required in other cases.

On the other hand, regardless of whether appropriate added information is associated with the image data or not, studied is an effective use of image data in a case where a large amount of data are stored in the image database.

One of effective uses of image data is a method of sequentially displaying images at a constant time interval ("slide show"), disclosed, for example, in Japanese Patent Examined Publication No. 4-17545, Japanese Patent Examined Publication No. 4-24747 and so on. The above publications disclose a function for a variable setting of the display interval of the slide show.

Since the images, however, are displayed only in a predetermined order such as the order of addresses at which the image data are stored in the background-art method of sequentially displaying images, it is impossible to make a sequential display in consideration of the contents of images and the search is made with very low efficiency.

SUMMARY OF THE INVENTION

According to an aspect of the present invention, an apparatus for comparing a plurality of objective images with a key image comprises: feature-value calculation means for obtaining a plurality of feature values for each of the objective images and the key image; weighting-factor setting means for setting weighting factors for the plurality of feature values respectively from the plurality of feature values of the key image; similarity-value calculation means for obtaining similarity values of each of the plurality of objective images to the key image with respect to the feature values; and total similarity-value calculation means for obtaining a total similarity value of each of the plurality of objective images to the key image from the similarity values and the weighting factors.

In the apparatus of this aspect, the weighting factors with respect to feature values specific to the key image can be obtained on the basis of the feature values of the key image while the similarity values of each objective image to the key image can be obtained with respect to feature values. Therefore, since the total similarity value can be obtained on the basis of the weighting factors specific to the feature values of the key image and the similarity values of the objective image to the key image with respect to the feature values, it is possible to compare the objective image with the key image without user's setting of the weighting factors by trial and error.

According to another aspect of the present invention, a similar-image retrieval apparatus comprises: resolution converting means for obtaining converted images with different resolutions for each of a plurality of objective images and a key image; feature-value calculation means for obtaining feature values with respect to each of the different resolutions; and similar-image retrieval means for obtaining a similar image out of the plurality of objective images on the basis of feature values for the key image with a first resolution and feature values of the plurality of objective images with a second resolution common to the first resolution.

In the similar-image retrieval apparatus, when judgment on whether two images are similar or not is performed on the basis of the feature values of the key image and the objective image, the feature values in accordance with a resolution of the images to be compared are adopted. Therefore, even if the key image and the objective image are reduced by limitation of the size of a screen to have lower resolution when these images are too large to be displayed, it is possible to perform a judgment on similarity with the resolution of the images before being reduced. On the other hand, by performing the judgment with the resolution of displayed images, a retrieval result and an impression of observed images are matched.

According to still another aspect of the present invention, an image sequential display apparatus comprises: a memory for storing a plurality of image data; image feature-value extraction means receiving the plurality of image data from the memory, for extracting image feature values for each of the plurality of image data; similarity-value calculation means for calculating similarity values on the basis of a result of comparison in feature values between a key image data which is one of the plurality of image data and each of objective image data which are others of the plurality of image data, the similarity values representing the measure of similarity of each of objective image data to the key image; and a controller for sequentially displaying the objective image data received from the memory on a display on the basis of the similarity values of the objective image data.

In the image sequential display apparatus, since the image data are sequentially displayed on the basis of the similarity values of the objective image data, a higher retrieval efficiency is achieved.

The present invention is also directed to a method of performing an image comparison, a method of retrieving a similar image and a method of sequentially displaying image data. Further, the present invention is directed to a recording medium recording a program to implement these methods with a computer.

The first object of the present invention is to provide a technique to allow an automatic setting of weighting factors for feature values of a key image, by which a user can enjoy higher operability in a search operation.

The second object of the present invention is to provide a technique to obtain feature values of an image to be compared, according to resolution, by which a user can enjoy higher operability in a search operation.

The third object of the present invention is to improve search efficiency when images are sequentially displayed.

These and other objects, features, aspects and advantages of the present invention will become more apparent from the following detailed description of the present invention when taken in conjunction with the accompanying drawings.

DESCRIPTION OF THE PREFERRED EMBODIMENTS

<1. System Configuration>

Figure 1:
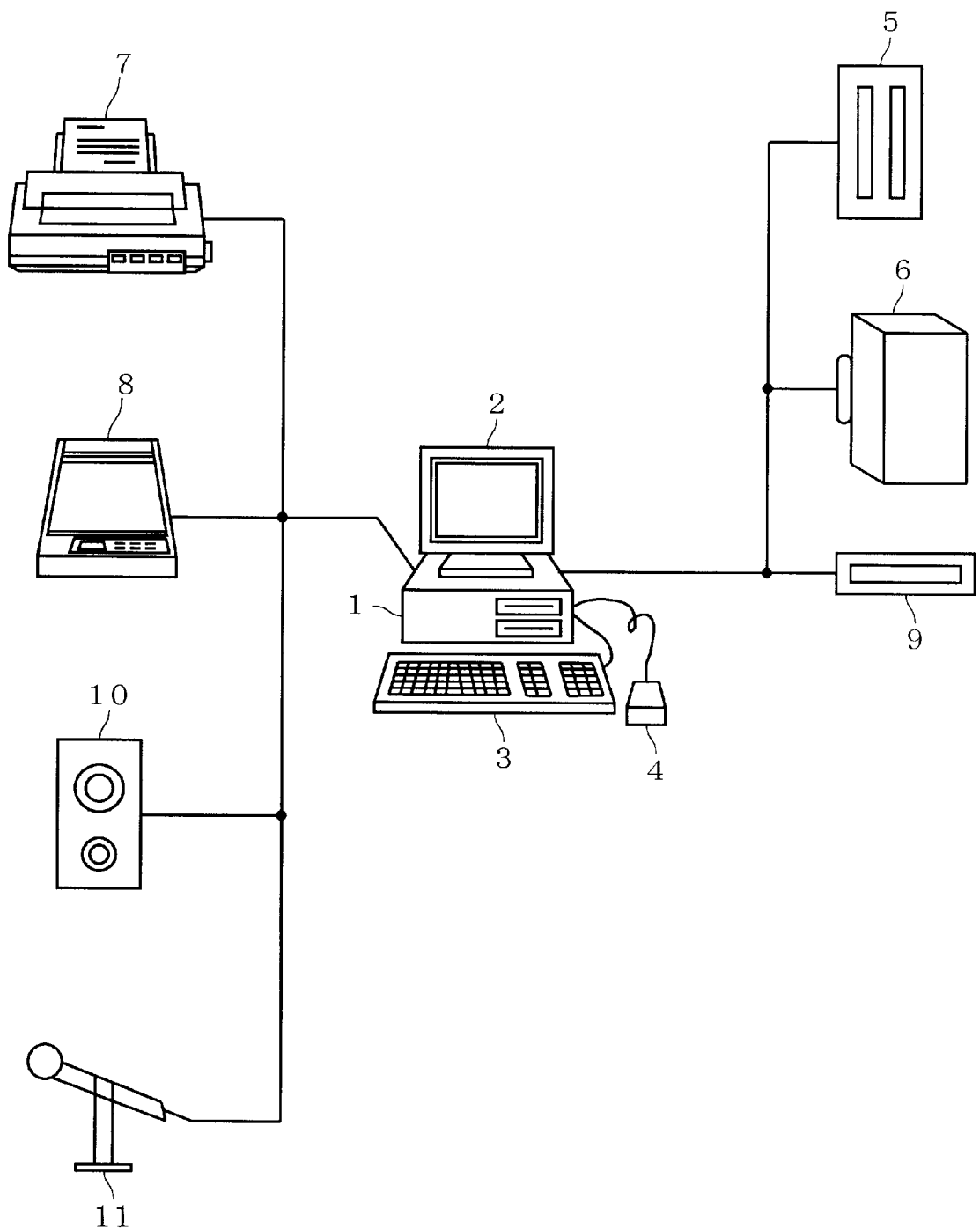
FIG. 1 is a conceptual diagram showing a configuration of an image retrieval system.

FIG. 1 is a diagram showing a configuration of a hardware system which works as an apparatus in accordance with the present invention. As shown in FIG. 1, the hardware system centers on a computer 1 serving as a control device internally having a CPU to control the whole system. Devices attached to the computer 1 are a display 2 for observably displaying image data and character data, a keyboard 3 and a mouse 4 for inputting various information, performing a command operation and the like.

Further, devices connected to the computer 1 are a flexible disk drive 5 for driving a flexible disk (generally called "floppy disk") serving as a data recording medium, a hard disk drive 6, a printer 7 for observably printing the image data and data obtained by image editing, a scanner 8 for capturing the image data, a CD-ROM drive 9 for driving a CD-ROM capable of storing image data, a speaker 10 for voice output and a microphone 11 for voice input.

Figure 2:
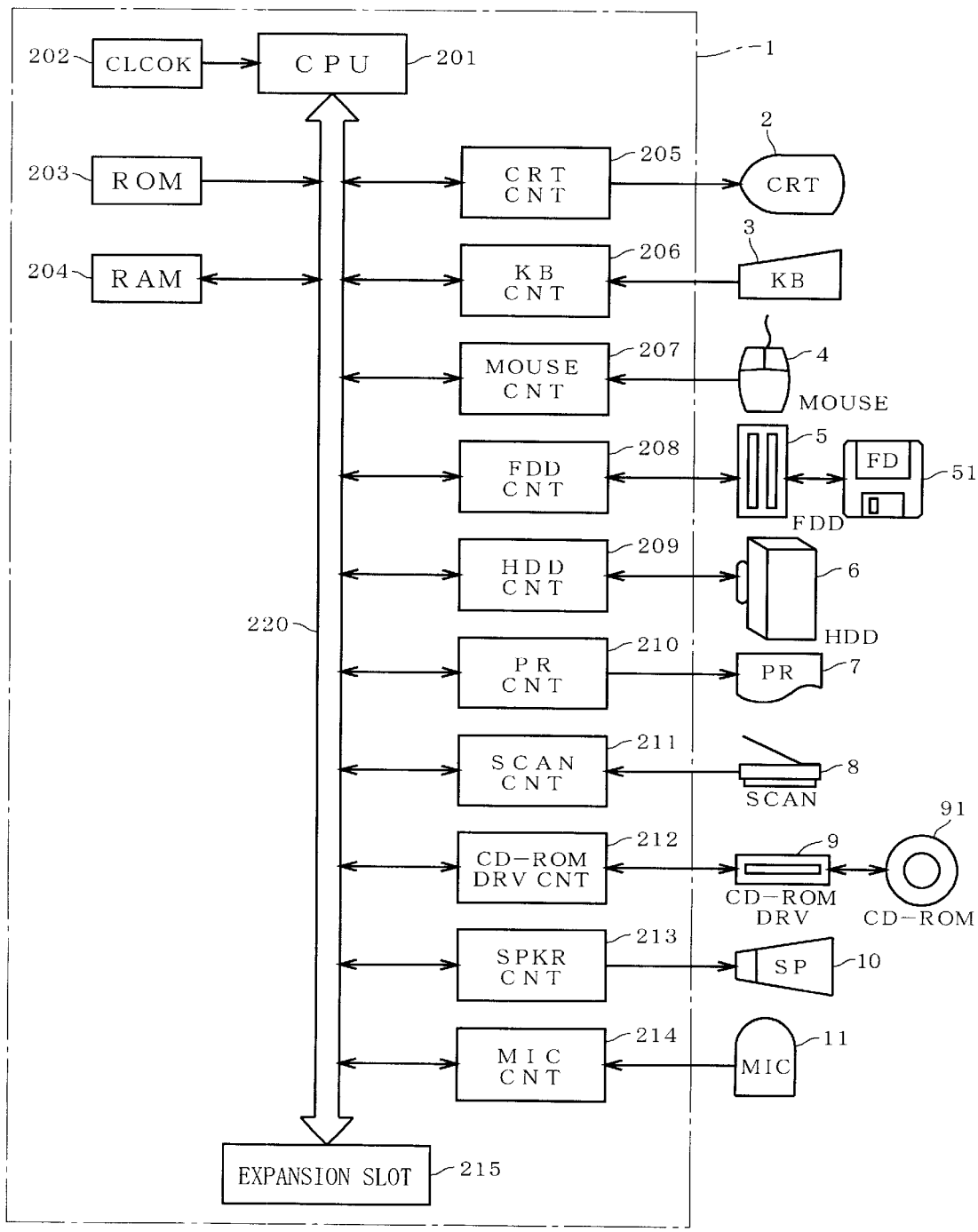
FIG. 2 is a block diagram showing the system configuration.

FIG. 2 is a block diagram showing an internal constitution of the computer 1. As shown in FIG. 2, a CPU 201 is provided to play a central part in the computer 1, for which the item number i80486 of Intel, for example, is used.

The CPU 201 is connected to a clock generation circuit 202, and operates in synchronization with a reference clock generated by the circuit 202.

The CPU 201 is further connected to a ROM 203, a RAM 204, a display control circuit (CRT CNT) 205, a keyboard control circuit (KB CNT) 206, a mouse control circuit (mouse CNT) 207, a flexible disk drive control circuit (FDD CNT) 208, a hard disk drive control circuit (HDD CNT) 209, a printer control circuit (PR CNT) 210, a scanner control circuit (SCAN CNT) 211, a CD-ROM drive control circuit (CD-ROM DRV CNT) 212, a speaker control circuit (SPKR CNT) 213, a microphone control circuit (MIC CNT) 214 and an expansion slot 215, and signals are transferred between the CPU 201 and these constituent elements 203 to 215 over a data bus 220.

The ROM 203 stores programs and the like for comparing the images, searching the image database for an image similar to the key image through comparison and performing a slide show, and the RAM 204 temporarily stores data, programs and the like. Storing a program for performing the following operation in the ROM 203 which is an internal recording medium avoids the necessity for externally reading the program.

On the other hand, the above program may be stored in an external recording medium such as a flexible disk 51, the hard disk or the CD-ROM 91 and read out on the RAM 204, to be executed.

The display control circuit 205 controls display of images, characters and the like on the display 2 on the basis of the image data and character data, and the keyboard control circuit 206 and the mouse control circuit 207 transfer input information received by the keyboard 3 and the mouse 4, respectively, onto the data bus 220.

The flexible disk drive control circuit 208, the hard disk drive control circuit 209 and the CD-ROM drive control circuit 212 control operations of the flexible disk drive 5, the hard disk drive 6 and the CD-ROM drive 9, respectively. The printer control circuit 210 controls printing operation of the printer 7, and the scanner control circuit 211 controls capturing operation of image data by the scanner 8. The speaker control circuit 213 and the microphone control circuit 214 control the voice output of the speaker 10 and the voice input of the microphone 11, respectively.

The expansion slot 215 allows installation of various expansion boards through which the computer 1 can be connected to external devices. For example, installing an SCSI board into the expansion slot 215 allows connection to the SCSI-capable flexible disk drive 5, hard disk drive 6, scanner 8, CD-ROM drive 9 and other external devices.

Though the flexible disk 51 and the hard disk are shown in the above system as a recording medium storing the program for performing an image retrieval and a slid show, the image data and the like, an MO (Magnetic Optical) disk and the like may be used. Further, instead of the scanner 8, other image data input device such as a digital camera may be used and instead of the printer 7, other output device such as digital copier may be used.

<2. The First Functional Configuration as Retrieval Apparatus>

Figure 3:
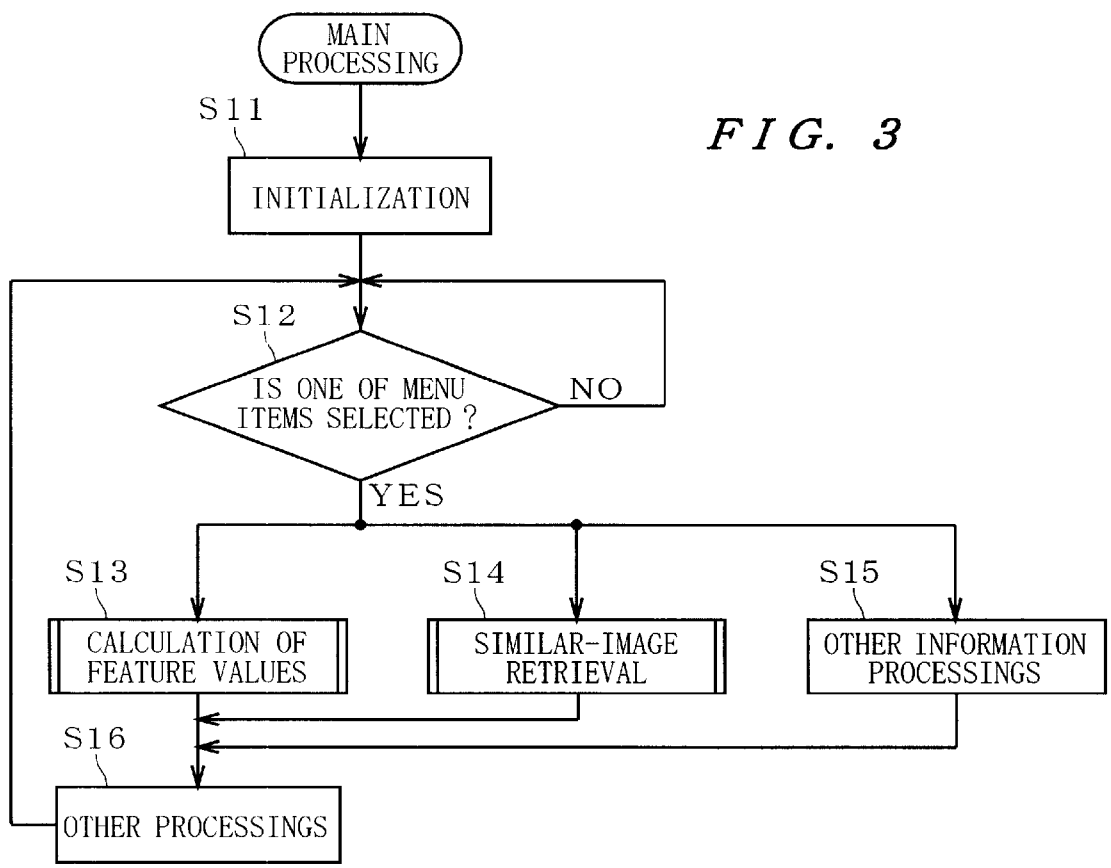
FIG. 3 is a flow chart showing an main operation flow of the system as an image retrieval apparatus.

FIG. 3 is a flow chart showing a main routine of a program for making the system of FIGS. 1 and 2 work as an image retrieval apparatus. The program may include steps having nothing to do with the similar-image retrieval as discussed below.

In the step S11, an initialization is made. Specifically, for example, initializations of flags needed for information processing, screen displays (e.g., a menu display showing kinds of information processings) and the like are performed. After that, in the step S12, an input is waited, which selects one of the information processings on the menu. When no selection is made, the step S12 is repeated.

Herein three paths according to the inputted selection are shown. One of the three paths leads to calculation of feature values of the image, another leads to a similar-image retrieval and the rest leads to other processings. When calculation of feature values of the image is selected, the feature values of the image are calculated in the step S13. When a similar-image retrieval is selected, a similar image is retrieved in the step S14. When one of other information processings is selected, the selected information processing is performed in the step S15. Each path leads to the step S16 where other information processings are performed. As mentioned earlier, in the steps S15 and S16, processings having nothing to do with the similar-image retrieval as discussed below may be performed.

Figure 4:
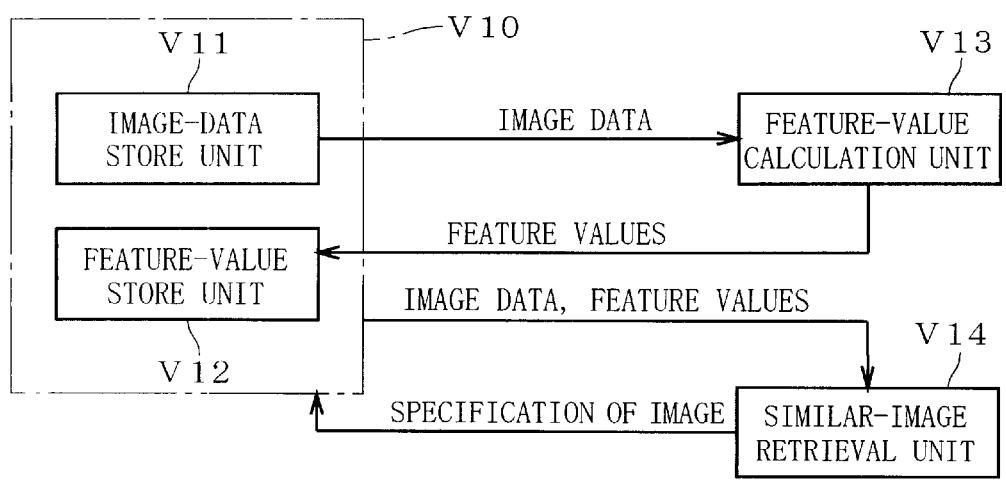
FIG. 4 is a block diagram showing the configuration in terms of function for achieving an image retrieval.

FIG. 4 is a block diagram showing a concept of function performed by the computer 1. It goes without saying that a device performing functions as blocked in FIG. 4, instead of the computer 1, may be used to achieve the present invention.

A data store unit V10 comprises an image-data store unit V11 for storing image data and a feature-value store unit V12 for storing feature values of images, and an image and feature values obtained from the image are stored in association with each other. For achieving the data store unit V10, for example, the flexible disk drive 5 and the hard disk drive 6 can be used. A feature-value calculation unit V13 receives the image data from the image-data store unit V11 to perform the processing of the step S13. A similar-image retrieval unit V14 specifies an image and receives the image data and the feature values on the specified image from the data store unit V10 to perform the processing of the step S14. For achieving the feature-value calculation unit V13 and the similar-image retrieval unit V14, the functions of the computer 1 can be used.

Figure 5:
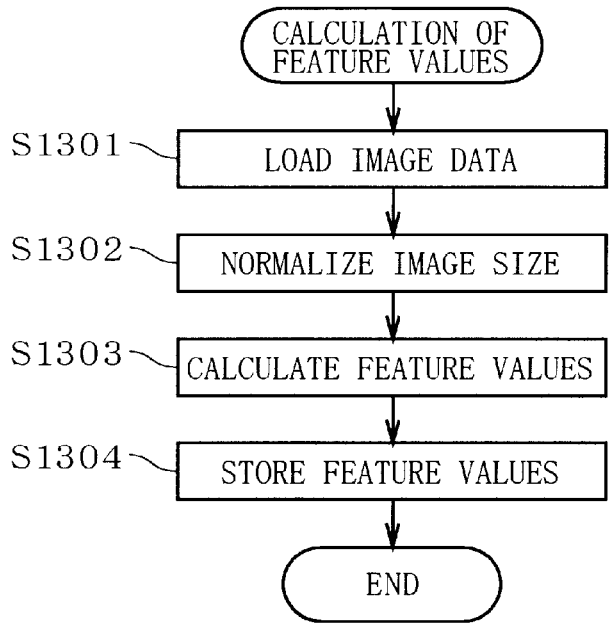
FIG. 5 is a flow chart showing calculation of feature values.

FIG. 5 is a flow chart showing the processing of the step S13 in detail. In the step S1301, the image data are loaded. In the step S1302, the size of the loaded image data is normalized. After that, the main processing of the step S13, i.e., calculation of feature values, is performed in the step S1303. The calculated feature values are stored in the step S1304.

Figure 6:
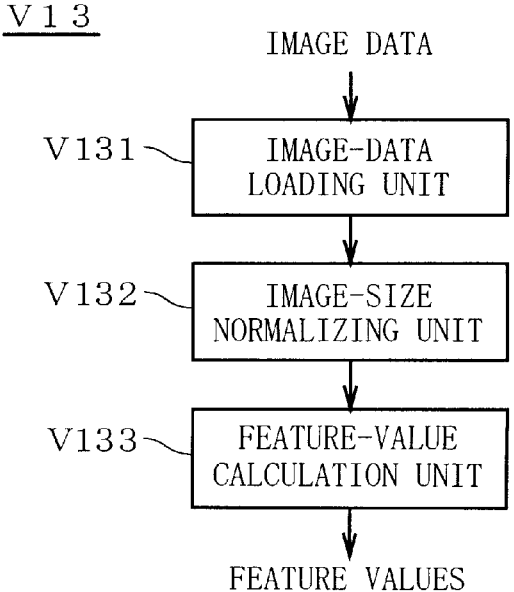
FIG. 6 is a block diagram showing the configuration in terms of function for calculation of the feature values.

FIG. 6 is a block diagram showing the feature-value calculation unit V13 which is one of the blocks indicating functional concepts of FIG. 4 in detail. An image-data loading unit V131, an image-size normalizing unit V132 and a feature-value calculation unit V133 perform the processings of the steps S1301, S1302 and S1303, respectively. The processing of the step S1304 is performed by the data store unit V10 of FIG. 4.

Among feature values calculated in the step S1303, for example, those of color and texture are well known. As an example of the feature value of color, the average value C of chromaticness is taken herein. To calculate the average value C of chromaticness, it is only necessary to convert the RGB value of pixels in the specified image into HSV value and obtain a histogram of chromaticness. The average value C is generally normalized to a value in a range from 0 to 1. As the feature value of texture, the peak value P of spectrum image and the edge intensity E are taken herein. The peak value P of spectrum image corresponds to the intensity of periodicity in texture and is a peak of spectrum image obtained by performing discrete Fourier transform (DFT) on the image data. The peak value P is obtained as a value, for example, in a range from 0 to 255. To obtain the edge intensity E, it is only necessary to monochromate the image and calculate a sum of differences each between a pixel and its adjacent pixel. The edge intensity E is generally normalized to a value in a range from 0 to 1.

Figure 7:
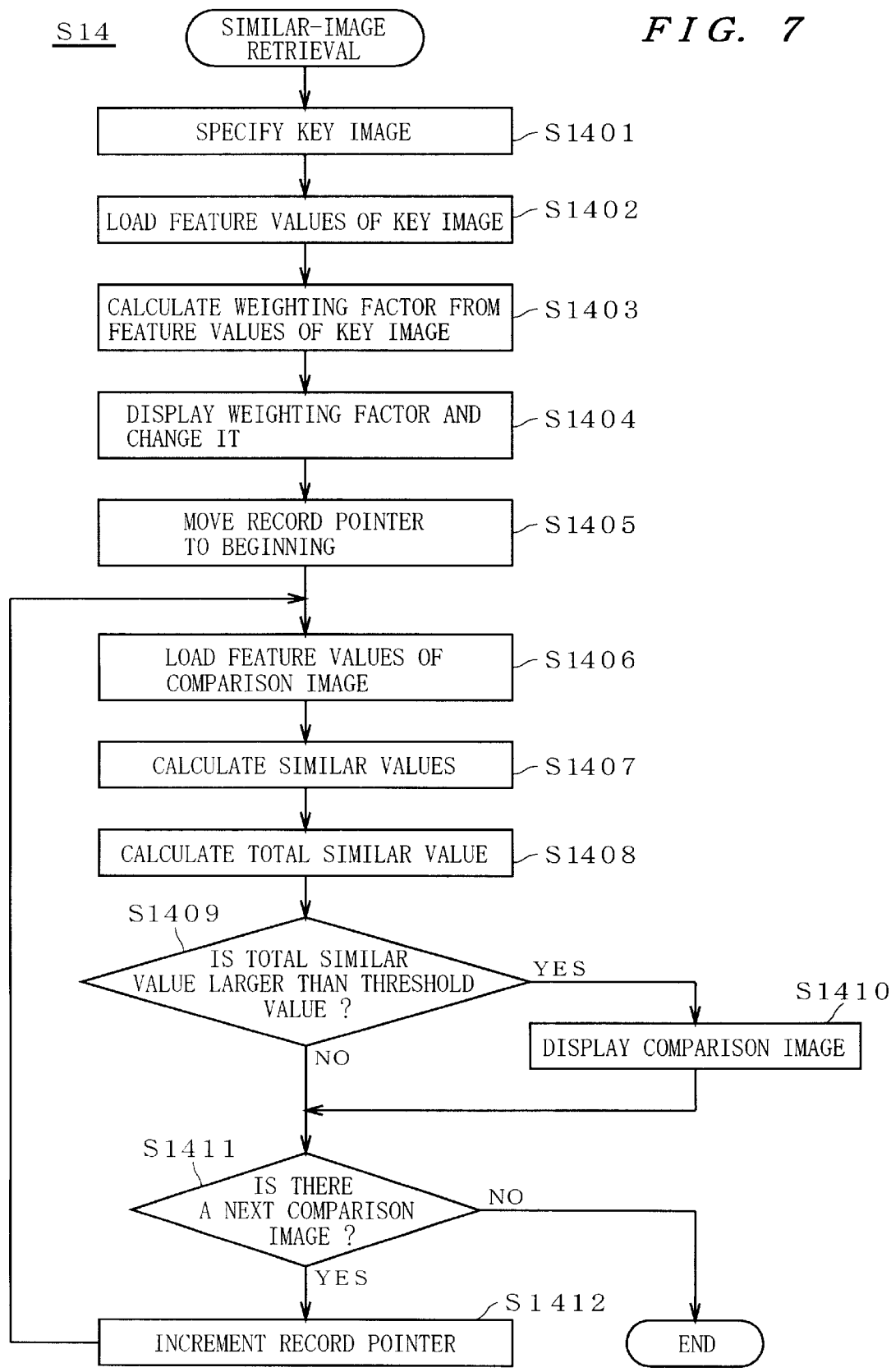
FIG. 7 is a flow chart showing a similar-image retrieval.
Figure 8:
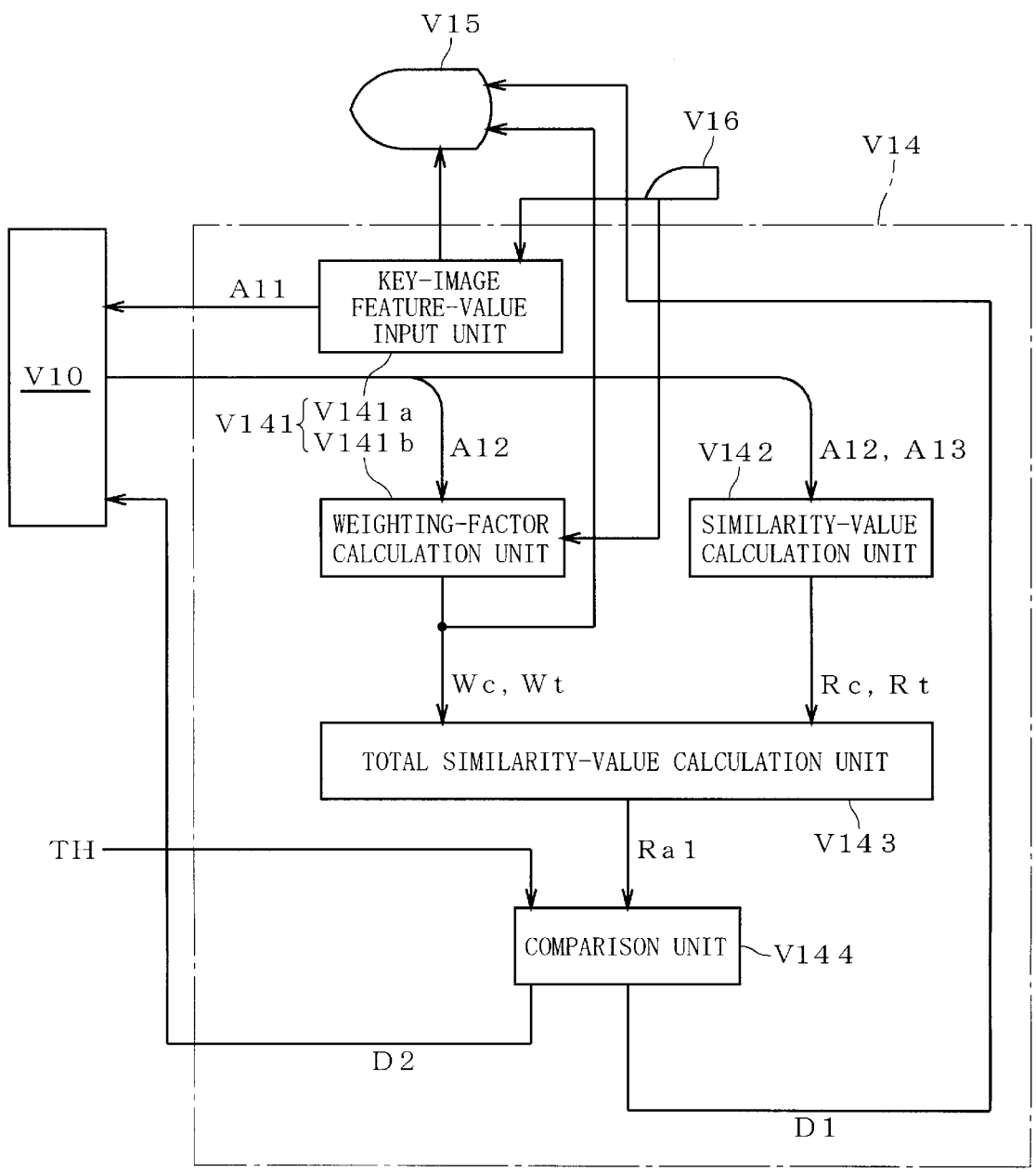
FIG. 8 is a block diagram showing the configuration in terms of function for the similar-image retrieval.

FIG. 7 is a flow chart showing the processing of the step S14 in detail. FIG. 8 is a block diagram showing the similar-image retrieval unit V14 in detail and its connection with peripheral blocks. The similar-image retrieval unit V14 comprises a weighting-factor setting unit V141, a similarity-value calculation unit V142, a total similarity-value calculation unit V143 and a comparison unit V144. The weighting-factor setting unit V141 consists of a key-image feature-value input unit V141$a$ connected to a display unit V15 for which the display 2 can be used, an input unit V16 for which the keyboard 3 and the mouse 4 can be used and the data store unit V10, and a weighting-factor calculation unit V141$b$ connected to the data store unit V10. The comparison unit V144 receives a threshold value TH serving as a comparison reference for a total similarity value Ra1 (discussed later) outputted from the total similarity-value calculation unit V143. The threshold value TH can be stored in, for example, the data store unit V10.

In the step S1401, a key image is specified. When a user operates the input unit V16, the key-image feature-value input unit V141$a$ gives a key-image specifying instruction A11 to the data store unit V10, to achieve key-image specification. In selection of the key image, there may be a procedure where a plurality of images are displayed on the display unit V15 and the user selects one out of these images. In this case, as the preferred embodiment, the display unit V15 may perform a catalog display of a plurality of images given from the data store unit V10, e.g., reduced images, before the instruction A11 is given to the data store unit V10.

In the step S1402, the feature values of the specified key image are loaded, and in the step S1403, weighting factors for the feature values are calculated from the feature values of the key image. For this calculation, the weighting-factor calculation unit V141$b$ receives feature values A12 of the key image from the data store unit V10 to output, for example, a color weighting factor Wc and a texture weighting factor Wt. In consideration of executing the step S1402, it is desirable to execute the step S13 before execution of the step S14 in the flow chart of FIG. 3.

For example, when the feature value A12 of the key image consists of the average value $C_0$ of chromaticness, the peak value $P_0$ of spectrum image and the edge intensity $E_0$, the color weighting factor Wc and the texture weighting factor Wt are determined as follows:

$Wc=1+Kc \cdot C_0$ $Wt=1+Kp \cdot P_0+Ke \cdot E_0$

Therefore, when the average value $C_0$ of chromaticness of the key image is larger, the color weighting factor Wc becomes larger, and when the peak value $P_0$ of spectrum image and the edge intensity $E_0$ of the key image are larger, the texture weighting factor Wt becomes larger. In other words, the ratio Wc/Wt of the weighting factors is large in a key image with not so much high intensities of periodicity in texture and edge and high chromaticness, and is small in a key image with not so high chromaticness and high intensities of periodicity in texture and edge. Coefficients Kc, Kp, Ke are appropriately set to control dynamic ranges of the feature values.

In the step S1404, the weighting factors are displayed. The user, observing the weighting factors, can select adopting the weighting factors or arbitrarily resetting with reference to these factors. For this display and selection, the weighting factors Wc and Wt are transferred to the display unit V15 and acknowledgement or reset of the weighting factors Wc and Wt are performed by the input unit V16.

In the step S1405, a record pointer indicating the memory address of a memory area storing images to be compared for search (hereinafter referred to as "objective images) is moved to the beginning of address. From this on, the similarity values indicating the degree of similarity on the objective images are sequentially obtained to check if the image is similar to the key image. This corresponds to initialization of the record pointer in the data store unit V10 of FIG. 8.

Next, in the step S1406, the feature values of the objective image are loaded. For this loading, the feature values A13 of the objective image is inputted from the data store unit V10 to the similarity-value calculation unit A142. In the step S1407, the similarity values are calculated from the feature values A12 of the key image and the feature values A13 of the objective image. For this reason, the feature values A12 of the key image are also inputted to the similarity-value calculation unit V142.

As calculation of the similarity values, for example, a color similarity value Rc and a texture similarity value Rt are separately obtained. The color similarity value Rc is obtained from, for example, the average value $C_0$ of chromaticness of the key image and the average value $C_j$ (j=1, 2, . . . ) of chromaticness of an objective image, and the texture similarity value Rt is obtained from, for example, the peak value $P_0$ of spectrum image and the edge intensity $E_0$ of the key image and the peak value $P_j$ of spectrum image and the edge intensity $E_j$ of the objective image.

In the step S1408, the total similarity value indicating the degree of total similarity is calculated. The total similarity is a single index obtained on the basis of a plurality of similarity values such as the color similarity value and texture similarity value, in consideration of the weighting factors obtained in the step S1403. Specifically, the similarity value with higher weighting factor contributes more to the total similarity value. For example, the total similarity value is defined as:

$Ra1=\Sigma(Wk \cdot Rk)/\Sigma Wk$ where k, Wk, Rk and $\Sigma$ represent the kind of similarity value, a weighting factor for the k-th feature values of the key image, a similarity value between the k-th feature values of the key image and the objective image and a sum with respect to the parameter k, respectively.

The total similarity value Ra1 is obtained in the total similarity-value calculation unit V143 from the color weighting factor Wc, texture weighting factor Wt, the color similarity value Rc and texture similarity value Rt, as:

$Ra1=(WcRc+WtRt)/(Wc+Wt)$

In the step S1409, whether the total similarity value is larger than a predetermined threshold value or not is checked, and when larger, it is judged that the key image and the objective image are similar. In this case, consequently, the objective image is displayed on the screen as a retrieved image in, the step S1410. In these steps, the comparison unit V144 compares the total similarity value Ra1 with the threshold value TH, and when Ra1>TH, gives a display command D1 to the display unit V15. In FIG. 8, for simple illustration, a path through which the image data are transferred from the data store unit V10 to the display unit V15 is omitted.

When it is found that the total similarity value is equal to or smaller than the threshold value in the step S1409 or the step S1410 is executed, whether there is an image to be next retrieved or not is checked in the step S1411, and when there is an image, the record pointer is incremented in the step S1412. In these steps, the comparison unit V144 compares the total similarity value Ra1 with the threshold value TH. When Ra1≦TH or the comparison unit V144 gives the display command D1 to the display unit V15, the unit V144 gives a retrieval command D2 to the data store unit V10 to input the feature values A13 of a new image data from the data store unit V10 to the similarity-value calculation unit V142.

When retrieval of all the objective images are completed in the step S1411, the processing of the step S14 is finished.

Thus, in the present invention, the weighting factor for feature value specific to the key image can be obtained on the basis of the feature value of the key image while the similarity value between each objective image and the key image can be obtained on each feature value. Further, the total similarity value is obtained on the basis of the weighting factor specific to the feature value of the key image and the similarity values between the feature values of the objective image and the key image. That eliminates the necessity for the user to set the weighting factors by trial and error and makes it possible to retrieve a desired similar image with less number of retrievals.

In the above discussion, entirely automatic setting of the weighting factors may be made, instead of executing the step S1403, or a step for user setting of the threshold value may be added before the step S1406.

Further, the weighting factor may be set as follows:

$Wc = Kc \cdot C_0 \ (Kc \cdot C_0 > 1)$ $Wc = 1 \ (Kc \cdot C_0 < 1)$ $Wt = Kp \cdot P_0 + Ke \cdot E_0 \ (Kp \cdot P_0 + Ke \cdot E_0 > 1)$ $Wt = 1 \ (Kp \cdot P_0 + Ke \cdot E_0 < 1)$ With the above setting, some weight is put only when the feature value is somewhat large and it is fixed that Wc=Wt=1 when all the feature values $C_0$, $P_0$ and $E_0$ are small, to make no difference among the weighting factors. Therefore, if the feature value is small and does not represent the feature of the image, no meaningless weight is put on and it is possible to avoid possibility of retrieving undesired images.

Figure 9:
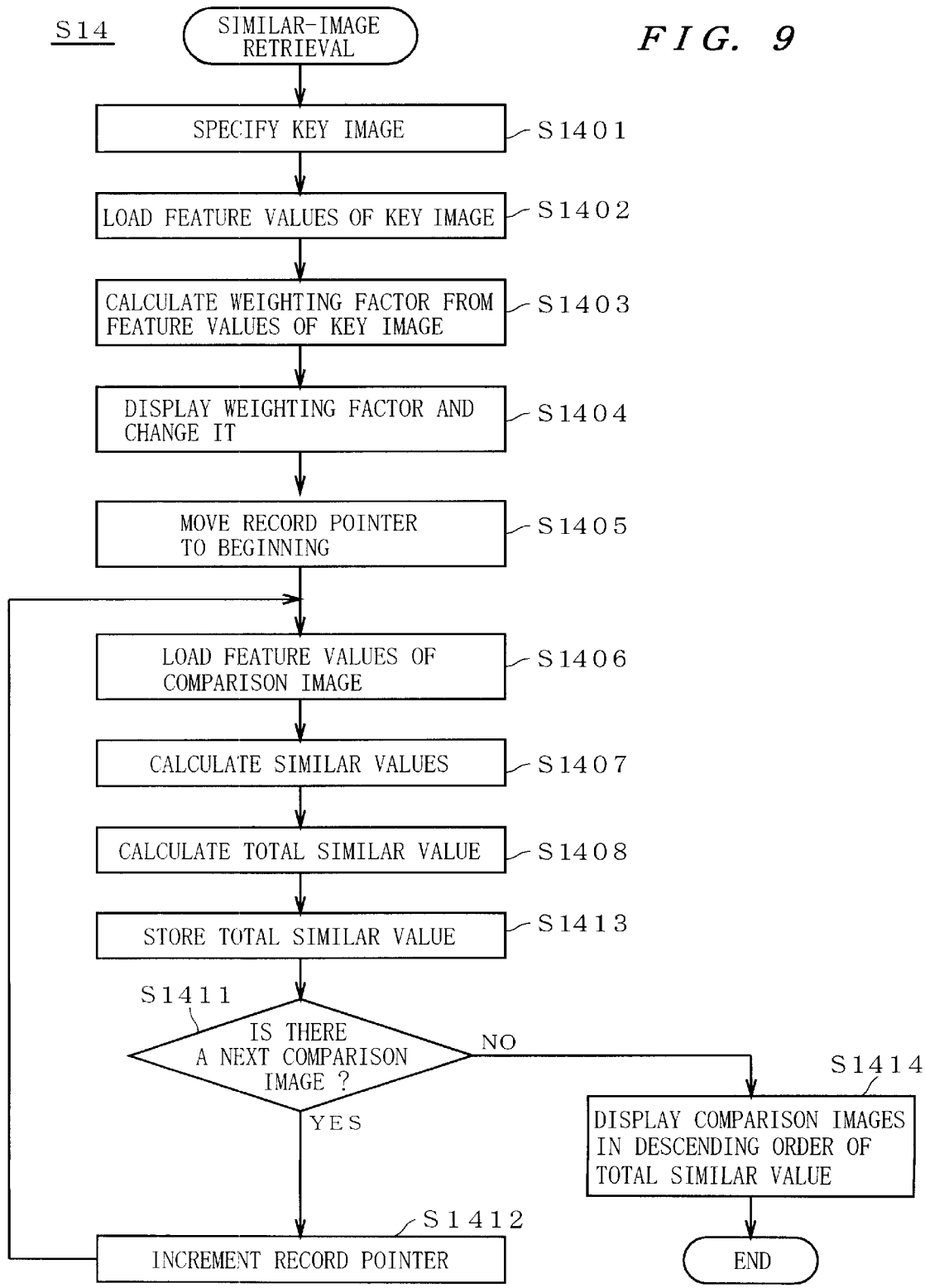
FIG. 9 is a flow chart showing a flow of a similar-image retrieval.

Further, instead of comparing the total similarity value with the predetermined threshold value to retrieve an image as discussed above, all the images may be displayed in descending order of total similarity value on the screen. FIG. 9 is a flow chart showing this operation. In the flow chart of FIG. 9 as compared with that of FIG. 7, the steps S1409 and S1410 of FIG. 7 are replaced with the step S1413, and the step S1414 which is executed when it is judged in the step S1411 that there is no image to be next retrieved (NO) is added.

In the step S1413, the total similarity value is stored. Therefore, the total similarity values obtained in the step S1408 for all the objective images are stored before it is judged no image (NO) in the step S1411. In the step S1414, the objective images are displayed in the order of total similarity value, and for example, an objective image with higher total similarity value is preferentially displayed.

Figure 10:
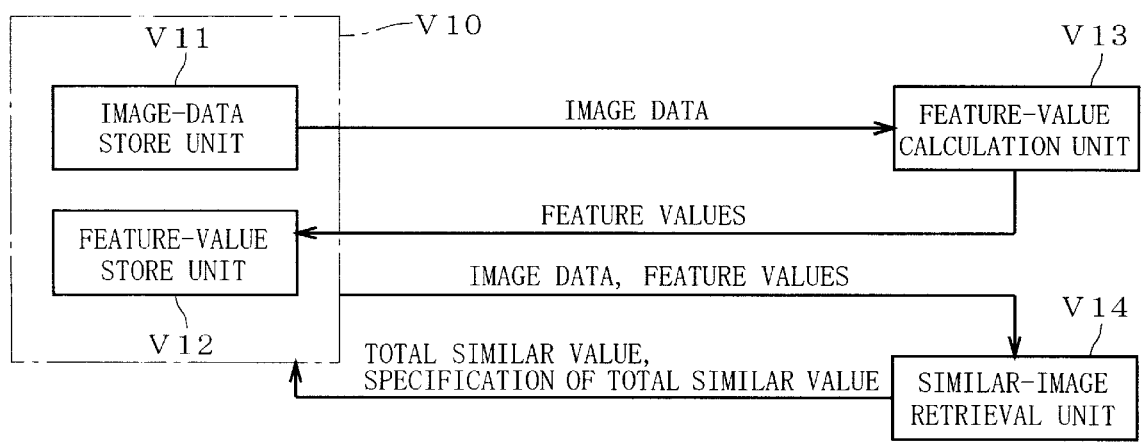
FIG. 10 is a block diagram showing the configuration in terms of function for achieving an image retrieval.

FIG. 10 is a block diagram showing functions to achieve the flow chart of FIG. 9. The similar-image retrieval unit V14 gives the total similarity value to the data store unit V10 to execute the step S1413. The data store unit V10 stores the total similarity value in association with the image data having the feature value on which the total similarity value is based. The total similarity value can be stored in, for example, the RAM 204 other than the data store unit V10 for which the flexible disk drive 5 and the hard disk drive 6 are used.

The similar-image retrieval unit V14 specifies the total similarity value, instead of the image to be displayed, to execute the step S1414. The data store unit V10 serves the image data associated with the specified total similarity value to the display unit V15 for display.

Figure 11:
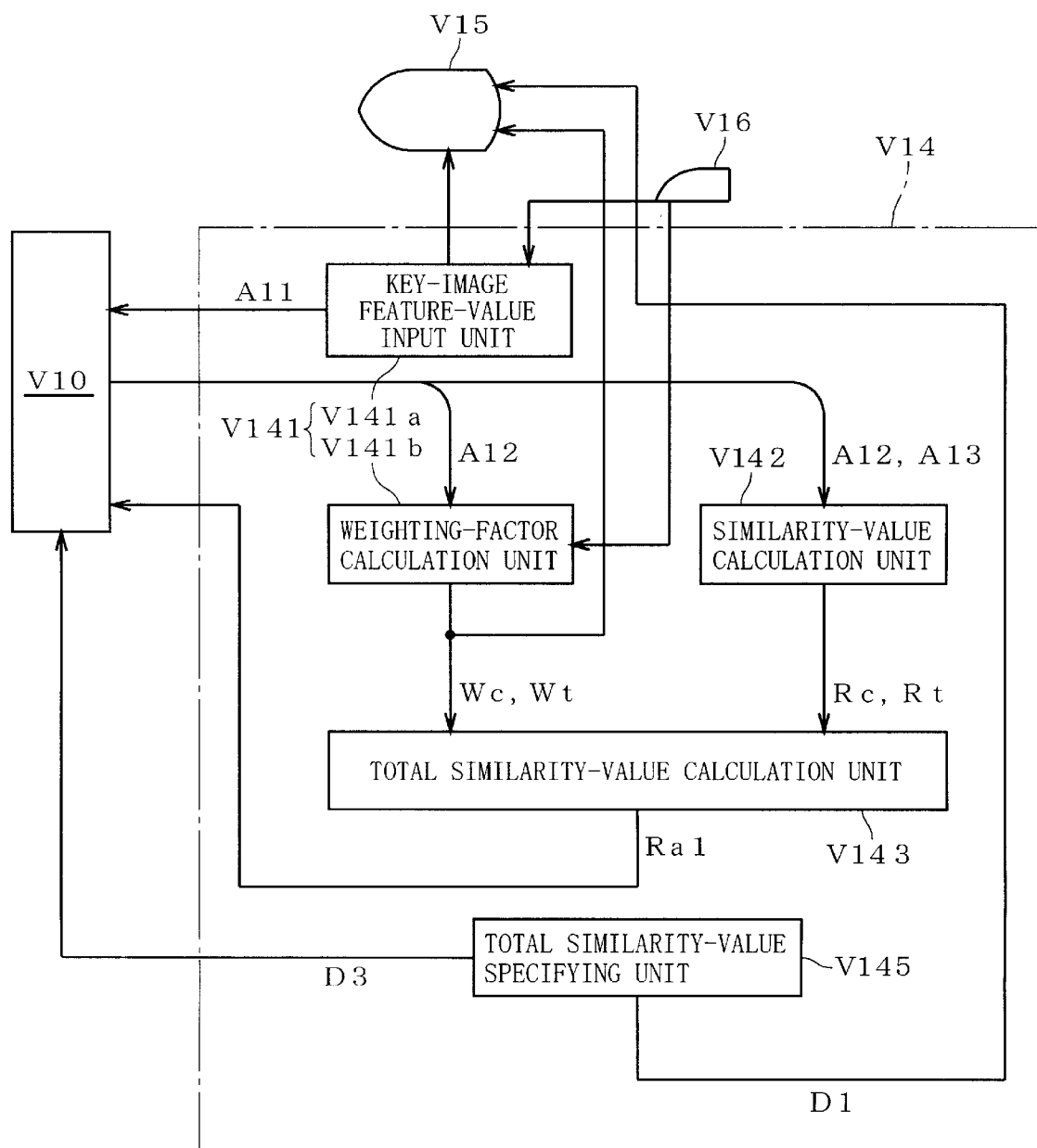
FIG. 11 is a block diagram showing the configuration in terms of function for a similar-image retrieval.

FIG. 11 is a block diagram showing the similar-image retrieval unit V14 of FIG. 10 in detail and its connection with peripheral blocks. In the configuration of FIG. 11 as compared with that of FIG. 8, the comparison unit V144 is replaced with an total similarity-value specifying unit V145. The unit V145 gives a command D3 of specifying the total similarity value to the data store unit V10. At this time, there may be a case where the total similarity-value specifying unit V145 stores the total similarity values on all the objective images in the RAM 204 and the like in advance, sorting the stored values in descending order, and sequentially outputs the command D3. There may be another case where the unit V145 outputs comparison values sequentially decreasing by a predetermined step value as the command D3, and draws image data having an total similarity value closest to the outputted value out from the data store unit V10. In either case, the display command D1 is given to the display unit V15, to display the corresponding image data on the screen.

Further, predetermined number of objective images may be displayed or all the images may be displayed. As the processing of the step S1414, to display the image data after sorting according to a certain index is well known, so detailed discussion is herein omitted.

To implement the flow chart in the above discussion, the computer 1 performs the functions based on a program stored in the ROM 203. Instead, to implement the flow chart, the computer 1 may read a program stored in a recording medium such as the flexible disk 51 through the flexible disk drive 5 and the like to perform the functions. Further, the program stored in the recording medium may be used to implement part of the flow chart, instead of the whole flow chart, because the flow chart can be implemented by using the stored program in conjunction with the program already read into the computer 1.

<3. The Second Functional Configuration as Retrieval Apparatus>

Figure 12:
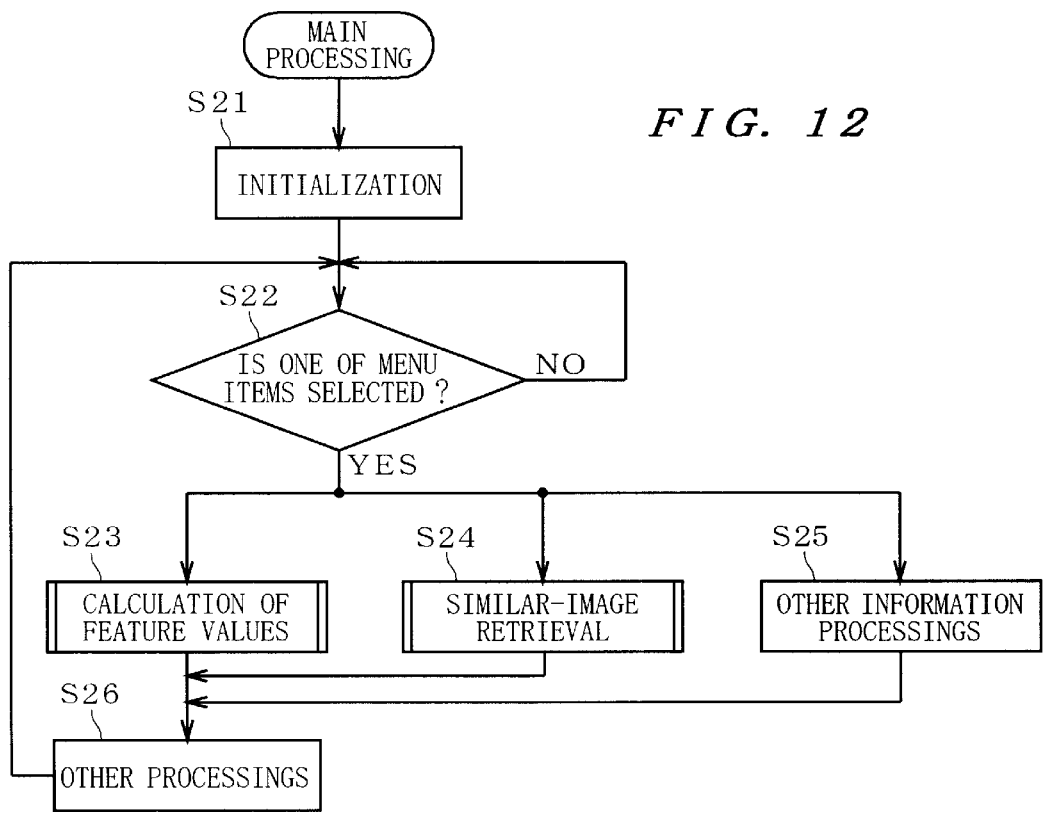
FIG. 12 is a flow chart showing a main operation flow of the system as an image retrieval apparatus.

FIG. 12 is a flow chart showing a main routine of a program for making the system of FIGS. 1 and 2 work as an image retrieval apparatus. As shown in FIG. 12, the flow of operation in the main routine is the same as that of FIG. 3. Specifically, an initialization is made in the step S21 and an input of selecting one of information processings in the menu is waited in the step S22. If no selection is made, the step S22 is repeated.

When calculation of feature values is selected, feature values are calculated in the step S23. When a similar-image retrieval is selected, a similar image is retrieved in the step S24. When one of other information processings is selected, the selected information processing is performed in the step S25. Each path leads to the step S26 where other information processing is performed. In the steps S25 and S26, processings having nothing to do with the similar-image retrieval as discussed in this preferred embodiment may be performed.

Figure 13:
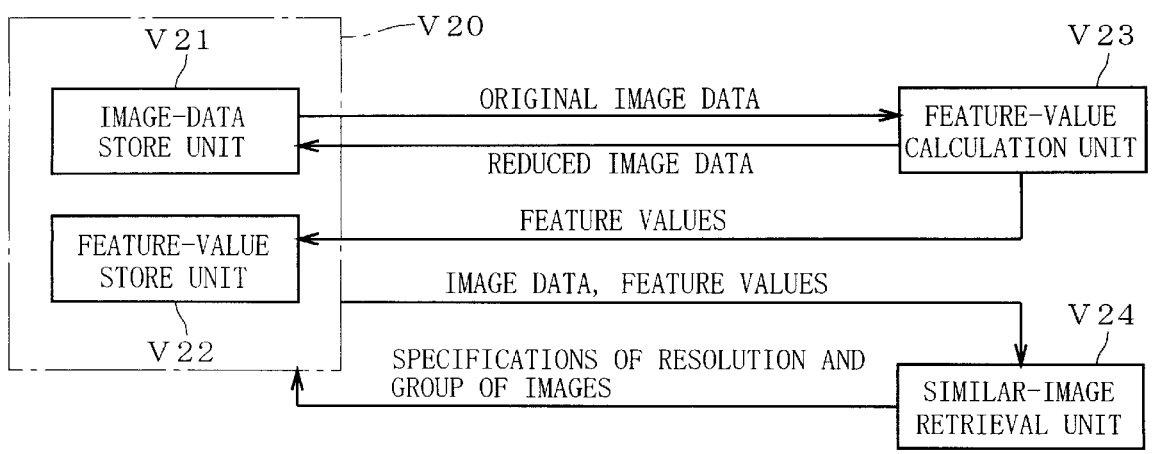
FIG. 13 is a block diagram showing the configuration in terms of function for achieving an image retrieval.

FIG. 13 is a block diagram showing a concept of function performed by the computer 1. It goes without saying that a device performing functions as blocked in FIG. 13, instead of the computer 1, may be used to achieve the present invention.

A data store unit V20 comprises an image-data store unit V21 for storing original image data and a feature-value store unit V22 for storing feature values of images, and an image and feature values obtained from the image are stored in association with each other. For achieving the data store unit V20, for example, the flexible disk drive 5 and the hard disk drive 6 can be used.

A feature-value calculation unit V23 receives the original image data from the image-data store unit V21, performs reduction of the original image to generate reduced image data and additionally stores the reduced image data into the image-data store unit V21. Further, the unit V23 obtains feature values of both the original image and the reduced image and stores the feature values into the feature-value store unit V22. The image-data store unit V21 can store an original image and the corresponding reduced image as a group of images.

A similar-image retrieval unit V24 specifies a group of images and resolution and obtains image data on an image (an original image or a reduced image) in the group of images and its feature values from the data store unit V20, to execute the step S24. For achieving the feature-value calculation unit V23 and the similar-image retrieval unit V24, the functions of the computer 1 can be used.

Figure 14:
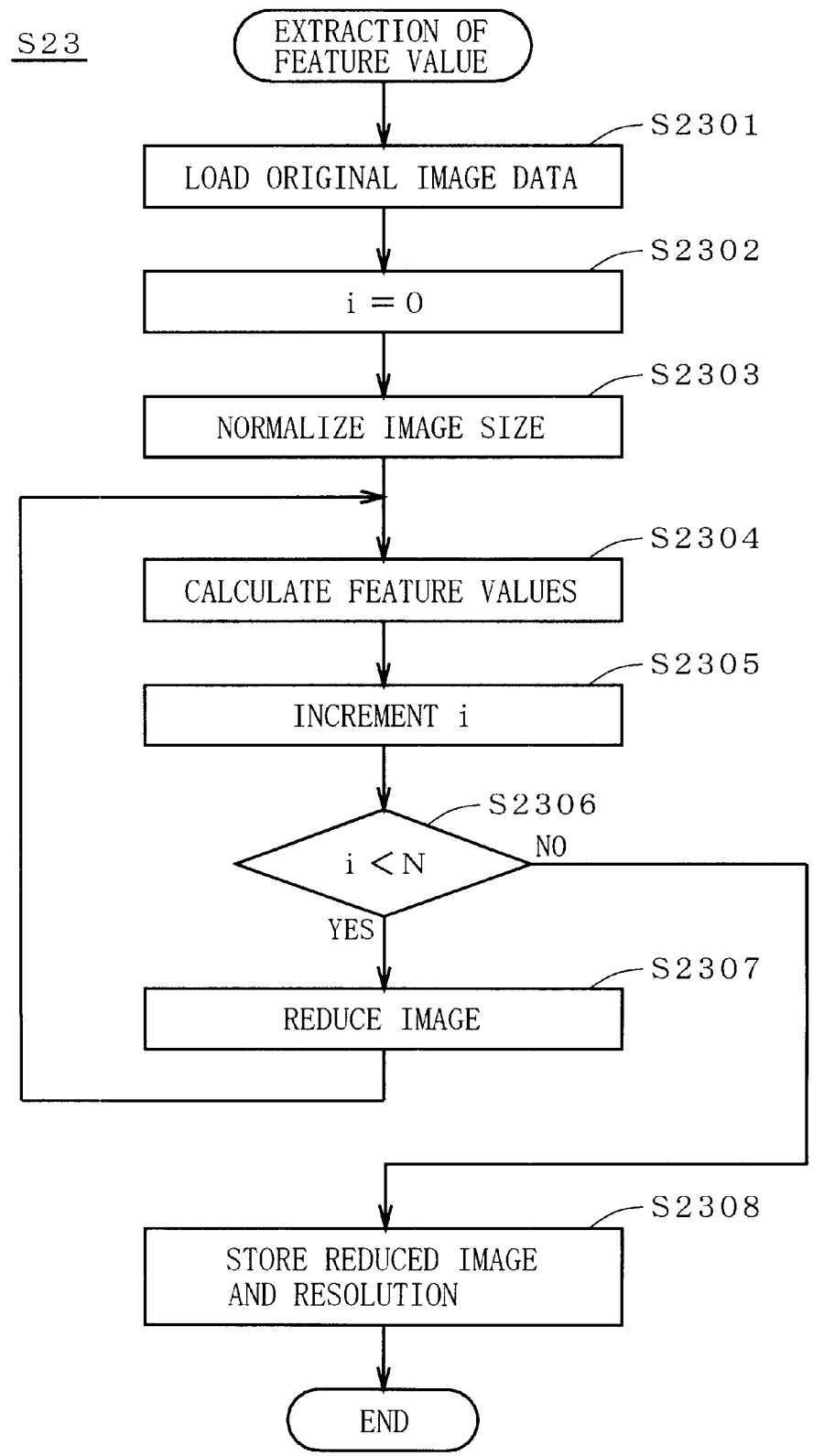
FIG. 14 is a flow chart showing a flow of calculation of feature values.

FIG. 14 is a flow chart showing the processing of the step S23 in detail. In the step S2301, the original image data are loaded. In the next step S2302, "0" is substituted into a loop control variable i.

In the step S2303, the size of the loaded original image data is normalized. "Normalization" refers to an image processing for reducing an image into a specified size, to thereby ensure reduction of image processing time and noise. For example, an image is so reduced as to fall within the size of 480×480 pixels while maintaining its aspect ratio. If the size of the original image is under the specified size, no normalization is made.

After that, the main processing of the step S23, i.e., calculation of feature values, is performed in the step S2304. Among feature values calculated in the step S2304, for example, those of color such as the average value of chromaticness and those of texture such as the peak value of spectrum image and edge intensity are well known.

The loop control variable i is incremented by 1 in the step S2305, and the incremented variable is compared with an upper limit value N in the step S2306. In the step S2306, the loop control variable i represents the number of executions of the step S2304. When the number of executions is smaller than the upper limit value N, an image reduction is performed in the step S2307 and then in the step S2304 again, feature values of the reduced image are obtained. The image reduction is performed according to predetermined ratios (e.g., 1/2 and 1/3) and the resolution decreases as the step S2307 is repeated.

The resolution can be obtained from the above specified size (or the size of the original image if it is smaller than the specified size), the predetermined ratio and the value of the loop control variable i. In other words, an image reduction unit V234 for performing this processing as discussed later (see FIG. 15) converts resolution of the image. The predetermined ratio may be a function of the loop control variable i.

When i first becomes not smaller than N ($i \geq N$) by increment operation in the step S2305, the step S2306 is followed by the step S2308. In the step S2308, the reduced image data and the resolution are stored. Thus, on an original image data, the reduced image data are obtained and respective feature values are further obtained, all of which are stored in a database. The normalized image is handled as a reduced image.

Figure 15:
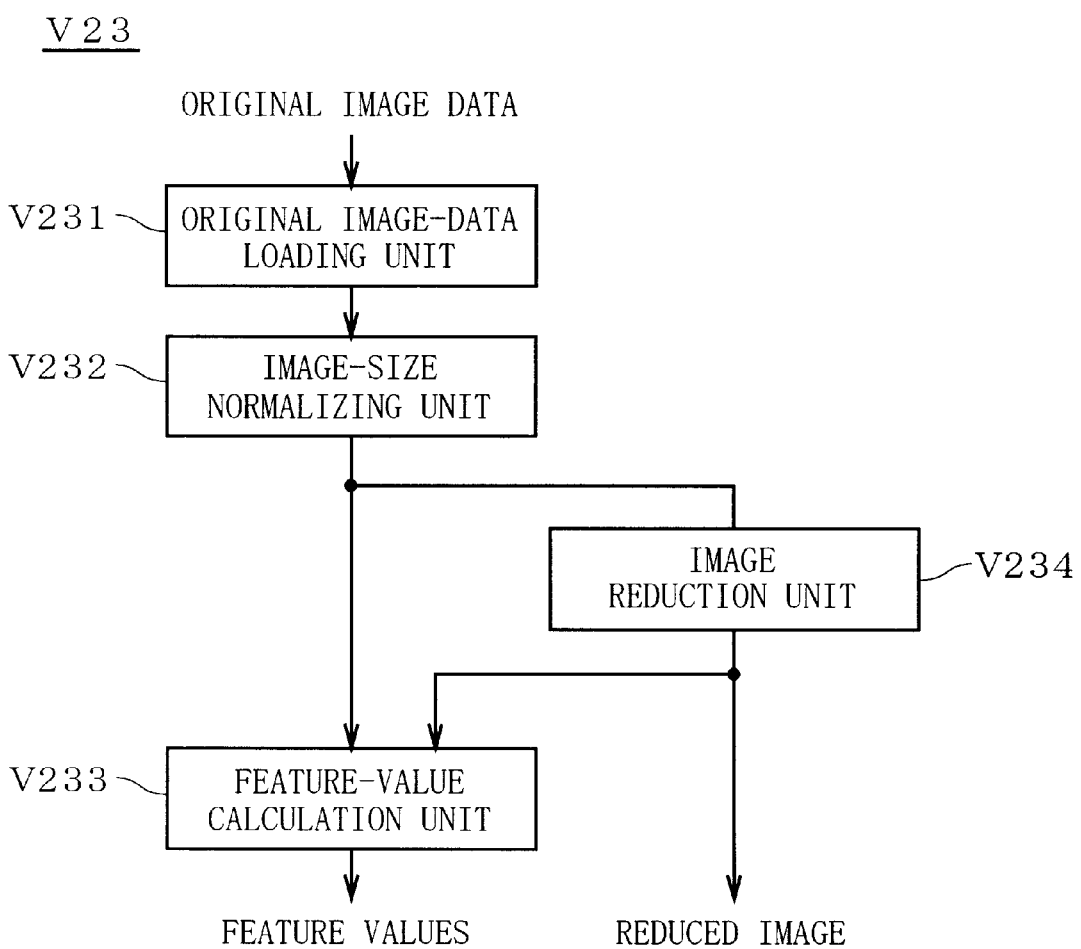
FIG. 15 is a block diagram showing the configuration in terms of function for calculation of the feature values.

FIG. 15 is a block diagram showing the feature-value calculation unit V23 which is one of the blocks indicating functional concepts of FIG. 12 in detail. An original image-data loading unit V231, an image-size normalizing unit V232, a feature-value calculation unit V233 and an image reduction unit V234 perform the processings of the steps S2301, S2303, S2304 and S2307, respectively. The processing of the step S2308 is performed by the data store unit V20 of FIG. 13.

Figure 16:
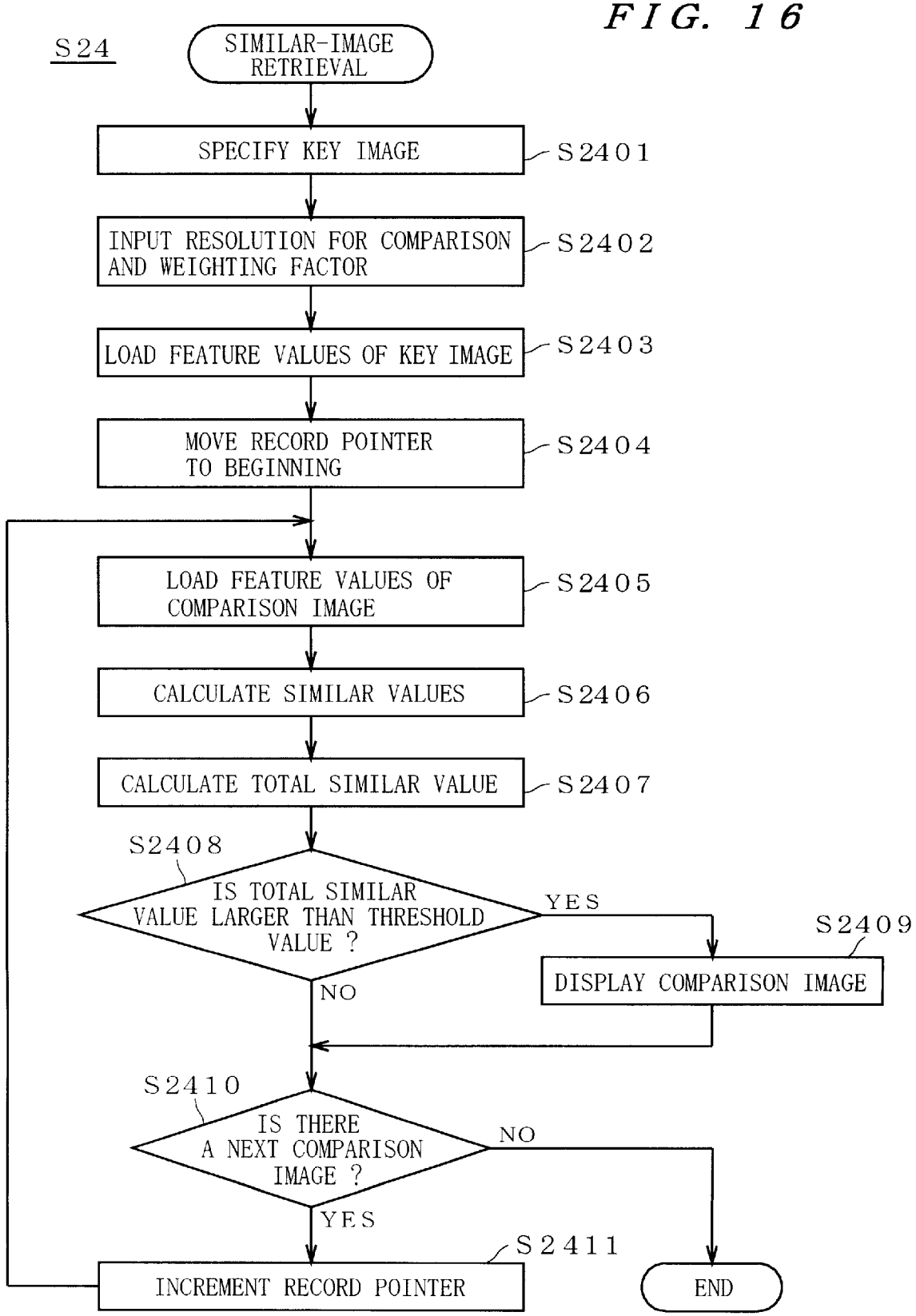
FIG. 16 is a flow chart showing a flow of a similar-image retrieval.
Figure 17:
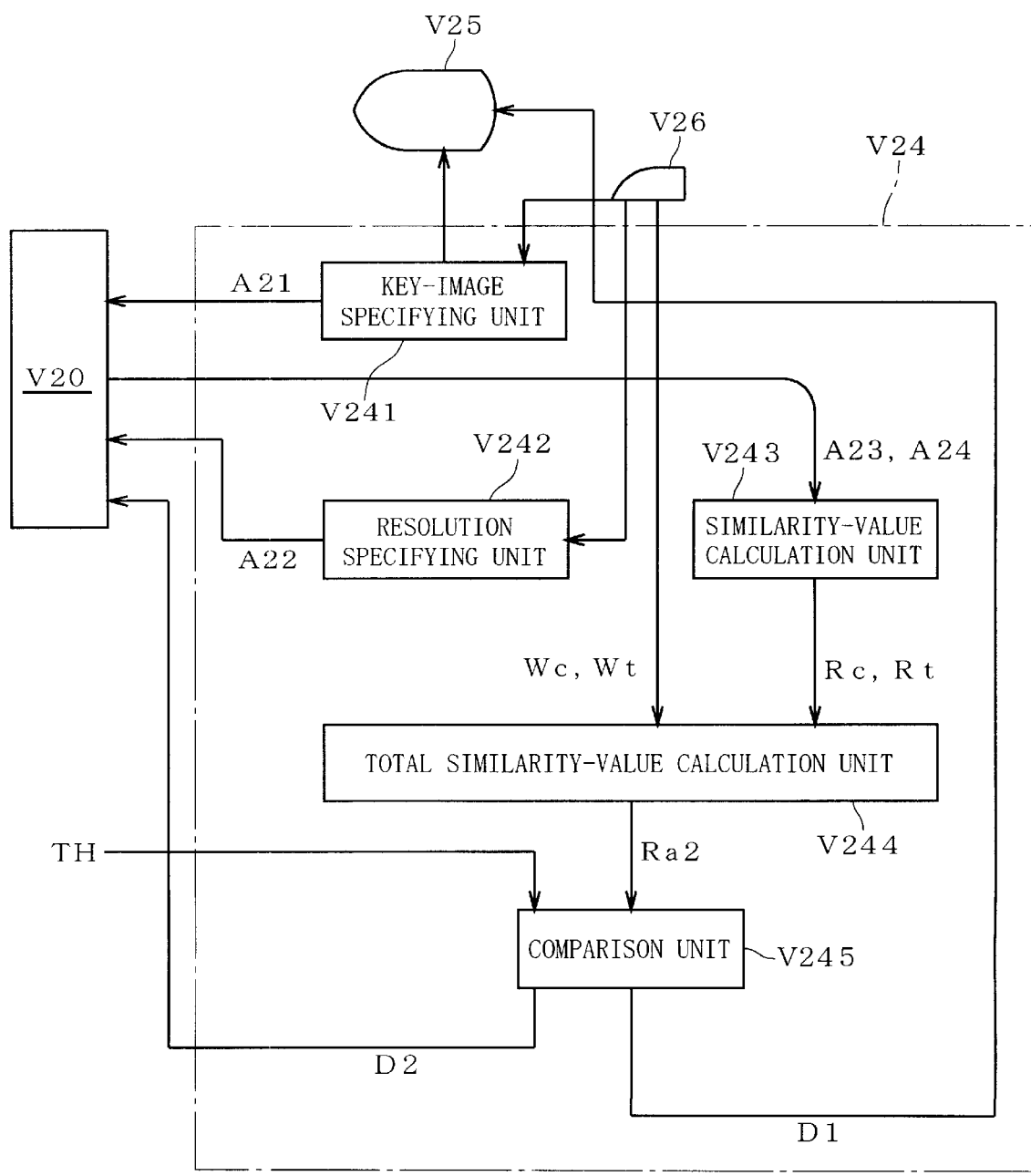
FIG. 17 is a block diagram showing the configuration in terms of function for the similar-image retrieval.

FIG. 16 is a flow chart showing the processing of the step S24 in detail. FIG. 17 is a block diagram showing the similar-image retrieval unit V24 in detail and its connection with peripheral blocks. The similar-image retrieval unit V24 comprises a key-image specifying unit V241, a resolution specifying unit V242, a similarity-value calculation unit V243, a total similarity-value calculation unit V244 and a comparison unit V245. The key-image specifying unit V241 is connected to a display unit V25 for which, for example, the display 2 can be used, an input unit V26 for which the keyboard 3 and the mouse 4 can be used and the data store unit V20. The comparison unit V245 receives the threshold value TH serving as a comparison reference for a total similarity value Ra2 (discussed later) outputted from the total similarity-value calculation unit V244. The threshold value TH can be stored in, for example, the data store unit V20.

In the step S2401, a key image is specified. When a user operates the input unit V26, the key-image specifying unit V241 gives a key-image specifying instruction A21 to the data store unit V20, to achieve key-image specification. In selection of the key image, there may be a procedure where a plurality of images are displayed on the display unit V25 and the user selects one out of these images. In this case, as one of the preferred embodiments, the display unit V25 may perform a catalog display of a plurality of images given from the data store unit V20, e.g., reduced images, before the instruction A21 is given to the data store unit V20.

In the step S2402, a resolution for comparison is specified and a weighting factor to be used for calculating the total similarity value Ra2 as discussed later is further inputted. With reference to FIG. 17, for executing this step, the input unit V26 makes the resolution specifying unit V242 give resolution information A22 to the data store unit V20 and inputs the color weighting factor Wc and the texture weighting factor Wt to the total similarity-value calculation unit V244.

Figure 18:
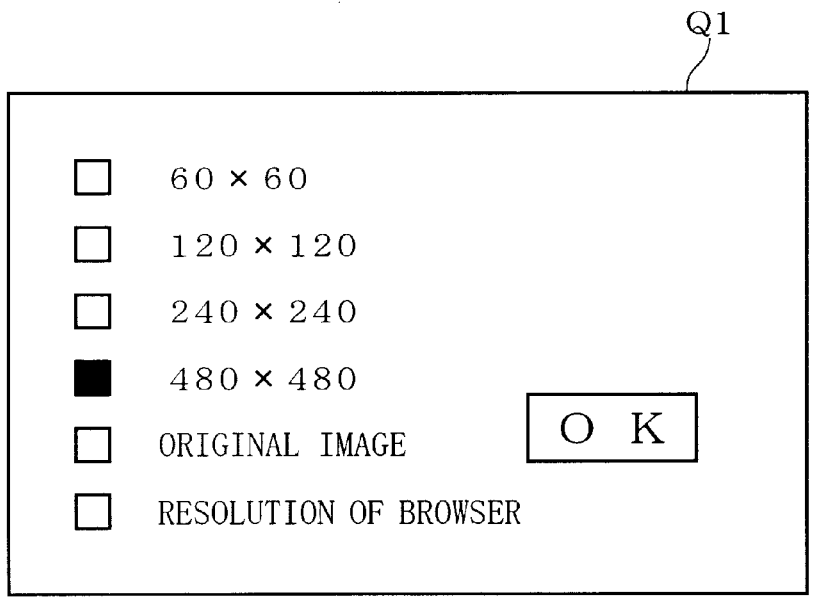
FIG. 18 shows an indication example of a screen for selecting resolution.

At this time, for user's easy specification of resolution, there may be a case where a plurality of resolutions available for comparison are displayed on the display unit V25, among which the user selects one. FIG. 18 shows an example of screen display served for such a selection. In a browser on the display screen, a resolution selecting dialogue Q1 has a plurality of options of resolution. Each of the numbers in FIG. 18 represent the number of pixels. When one of the options is selected and then a specification button ("OK" in FIG. 18) for starting comparison between images with selected resolution is clicked with the input unit V26, an image retrieval with selected resolution is performed. The resolutions presented as options correspond to those obtained by repeated executions of the step S2307.

At this time, if "original image" is selected, since comparison is made on the basis of the feature values of original images, regardless of the resolution of the key image displayed on the screen or that of a similar image displayed as a retrieval result, it is possible to judge whether the two images are similar or not with the resolutions of original images even if the key image and the objective image are reduced for display according to the limit of the size of screen to have lower resolution when the image retrieval is performed while those images on the display screen are observed. This is effective when the original image is so large that it is hard to display on a browser.

If "browser resolution" is selected, comparison in feature values is performed with respect to one of the reduced images that is closest to the key image on the display screen. So without bothersome specification procedure, it is possible to judge whether the key image and the objective image are similar or not with impression of observed images when those images are displayed for image retrieval.

Referring back to FIG. 16, in the step S2403, the feature values of the specified key image with the specified resolution are loaded. If the specified resolution is lower than that of the original image, one of the group of images including the key image is picked up as the corresponding reduced image and its feature values are loaded. For this processing, in FIG. 17, the feature values A23 of the original image or the reduced image in the group of images including the key image obtained from the key-image specification command A21 and the resolution information A22 are outputted to the data store unit V20.

In the step S2404, a record pointer indicating the memory address of a memory area storing objective images is moved to the beginning of address. From this on, the similarity values on the objective images are sequentially obtained to check if the image is similar to the key image. This corresponds to initialization of the record pointer in the data store unit V20 of FIG. 17.

Next, in the step S2405, the feature values of the objective image are loaded. More precisely, the feature values of the original image or the reduced image with the resolution inputted in the step S2402 in the group of images including the original objective image are loaded. For performing this loading, the feature values A23 of the objective image (the original image or the reduced image) is outputted to the data store unit V20.

In the step S2406, the similarity values between the key image and the objective image having a common resolution is calculated. For performing this calculation, in FIG. 17, the similarity-value calculation unit V243 calculates the color similarity value Rc and the texture similarity value Rt from the feature values A23 of the key image and the feature values A24 of the objective image.

"Common resolution" is not necessarily the same resolution, but if the resolution of the original image is lower than the predetermined resolution, those two resolutions are also regarded as common resolution. Since many images are normalized in size in the step S2303 and then their resolutions are converted in the step S2307, the reduced images with the same resolution are obtained, but when the original images are compared, their resolutions are not the same. Though one of the resolutions of the two original images is regarded as the predetermined resolution and the other is lower, the same processing as in the case of the two images with the same resolution is performed.

Further, if the size of the original image is lower than the specified size, for example, the predetermined resolution of 480×480 pixels, no normalization is made in the step S2303. In this case, the resolution of the reduced image obtained in the step S2307 varies from group to group of images. The feature values, however, corresponding to a resolution closest to the specified resolution is adapted for judgment of similarity. For example, in a case where the resolution of the original image is lower than 480×480 pixels, when the resolution "480×480 pixels" is selected in the dialogue Q1 of FIG. 18, the feature values of the original image are loaded in the step S2405 in this preferred embodiment.

In the step S2407, the total similarity value is calculated. The total similarity value is a single index obtained on the basis of a plurality of similarity values such as the color similarity value and texture similarity value, in consideration of the weighting factor inputted in the step S2402. Specifically, the similarity value with higher weighting factor contributes more to the total similarity value. For example, the total similarity value is defined as:

$$Ra2 = \Sigma Wk \cdot Rk$$

where k, Wk, Rk and $\Sigma$ represent the kind of similarity value, a weighting factor for the k-th feature value of the key image, similarity values: between the k-th feature values of the key image and the objective image and a sum with respect to the parameter k, respectively. The total similarity value Ra2 is obtained in the total similarity-value calculation unit V244 from the color weighting factor Wc, texture weighting factor Wt, the color similarity value Rc and the texture similarity value Rt, as:

$$Ra2 = WcRc + WtRt$$

In the step S2408, whether the total similarity value is larger than a predetermined threshold value or not is checked, and when larger, it is judged that the key image and the objective image is similar. In this case, consequently, the objective image is displayed on the screen as a retrieved image in the step S2409. In these steps, the comparison unit V245 compares the total similarity value Ra2 with the threshold value TH, and when Ra2>TH, gives the display command D1 to the display unit V25.

Figure 19:
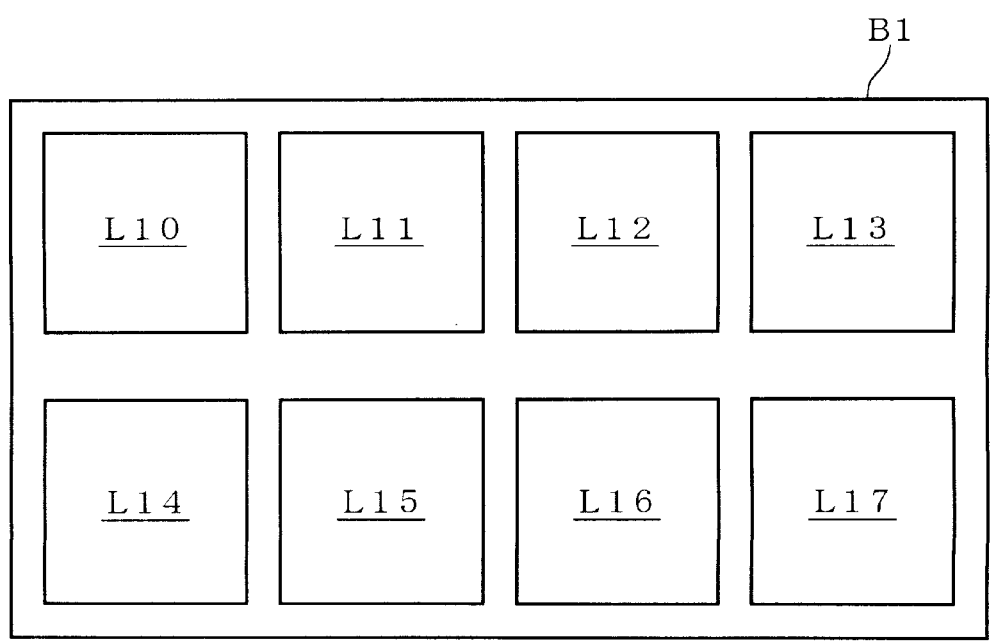
FIG. 19 shows a display example on a browser in a search operation with resolution of 120×120 pixels.
Figure 20:
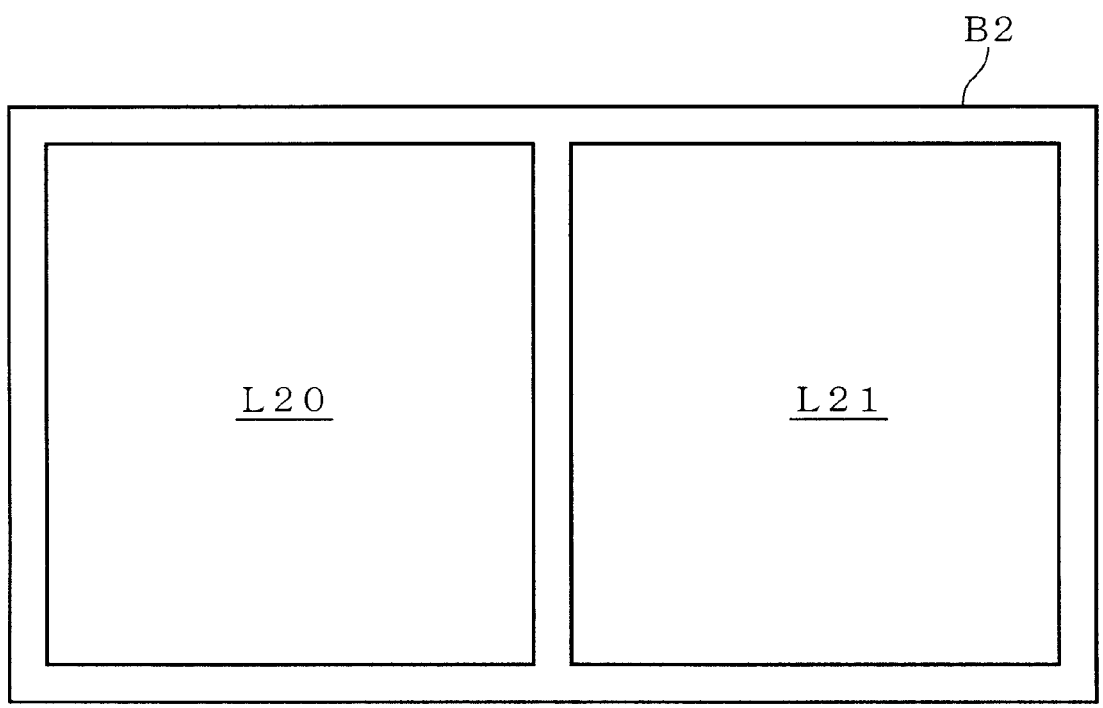
FIG. 20 shows a display example on a browser in a search operation with resolution of 240×240 pixels.

FIG. 19 shows a display on browser B1 in retrieving images with resolution of 120×120 pixels while FIG. 20 shows a display on browser B2 in retrieving images with resolution of 240×240 pixels. Reduced images L10 and L20 are key images and reduced images L11 to L17 and L21 are objective images. In FIG. 17, for simple illustration, a path through which the image data are transferred from the data store unit V20 to the display unit V25 is omitted.

When it is found that the total similarity value is equal to or smaller than the threshold value in the step S2408 or the step S2409 is executed, whether there is an image to be next retrieved or not is checked in the step S2410, and when there is an image, the record pointer is incremented in the step S2411. For executing these steps, the comparison unit V245 compares the total similarity value Ra2 with the threshold value TH. When Ra2≦TH or the comparison unit V245 gives the display command D1 to the display unit V25, the unit V245 gives a retrieval command D2 to the data store unit V20 to input the feature values A24 of a new image data from the data store unit V20 to the similarity-value calculation unit V243.

When retrieval of all the objective images are completed in the step S2410, the processing of the step S24 is finished.

Thus, in the present invention, for judgment of similarity between the key image and the objective image on the basis of the their feature values, the feature values according to the resolution of these images to be compared are adopted. Therefore, even when the original image is too large to be displayed on the browser and reduced according to the limit of the screen size to have lower resolution, it is possible to judge the similarity with the resolution of the original image. Conversely, judging the similarity of images with the resolution on the display browser allows the retrieval result to be matched with the impression from the observed image.

In the above discussion, a step for user setting of the threshold value may be added before the step S2405.

Further, instead of storing the reduced images into the image-data store unit V21 as discussed above, only the feature values obtained from the reduced images may be stored. Since the image, even reduced, has a large amount of data, this variation can remarkably reduce the required storage capacity. In this variation, however, the reduced image has to be produced on every display.

The step S23 for calculating the feature values with respect to each reduced image and storing the same as discussed above may be omitted only if an image database storing feature values on a plurality of resolutions is separately provided. In this case, it is only necessary to provide the retrieval step S24 for searching the database.

Instead of storing the feature values on a plurality of resolutions which are calculated in advance in the feature-value store unit V22, the feature values may be calculated on every retrieval. In this case, the feature values on a plurality of resolutions do not have to be calculated and those on the specified resolution only has to be calculated.

Further, the resolution itself has not be necessarily specified for the similar-image retrieval in the step S2402. The resolution may be indirectly specified by using parameters on resolution, such as image size and the number of pixels.

To implement the flow chart in the above discussion, the computer 1 performs the functions based on a program stored in the ROM 203. Instead, to implement the flow chart, the computer 1 may read a program stored in a recording medium such as the flexible disk 51 through the flexible disk drive 5 and the like to perform the functions. Further, the program stored in the recording medium may be used to implement part of the flow chart, instead of the whole flow chart, because the flow chart can be implemented by using the stored program in conjunction with the program already read into the computer 1.

<4. Functional Configuration as Slide Show Using Retrieval>

Figure 21:
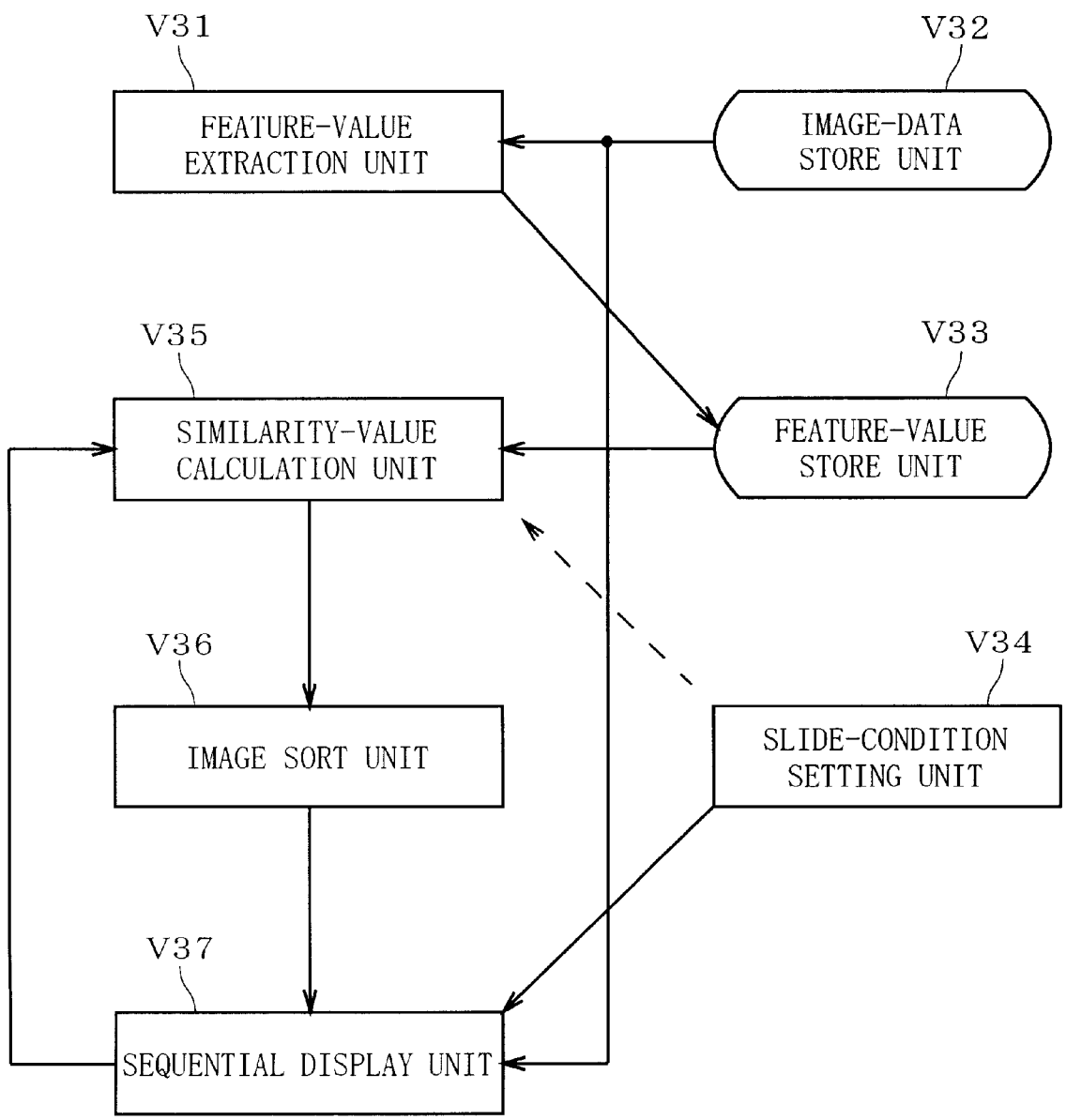
FIG. 21 is a block diagram showing the configuration in terms of function for a sequential display of images.

FIG. 21 is a block diagram showing a functional configuration of the system shown in FIGS. 1 and 2 used as an image sequential display apparatus. As shown in FIG. 21, a feature-value extraction unit V31 sequentially receives image data from an image database stored in an image-data store unit V32, extracts the feature values of an image indicated by each image data and stores the extracted values into a feature-value store unit V33. At this time, a common identification and the like is attached to the image data and its feature values and so on, thereby allowing a one-to-one correspondence between them.

A slide-condition setting unit V34 sets a slide-condition setting value including information on presence of specification on similarity-value variation function and a content of the function, key-image change information defining a change timing of the key image (key image data) and key-image selection information defining a selection criterion. Further, the slide-condition setting value may include start key-image information defining the key image at the start.

A similarity-value calculation unit V35 loads the feature values of each image from the feature-value store unit V33, and calculates the similarity values serving as a measure of similarity of each image to the key image on the basis of a result of comparison between the feature values of the key image and those of an image other than the key image (objective image). The key image at the start is determined on the basis of the slide-condition setting value when the slide-condition setting value has specification information on the key image at the start, and otherwise the similarity-value calculation unit V35 determines the key image at the start at random.

An image sort unit V36 sorts all the images (precisely, all the image data) according to the similarity values in descending order, to obtain a sort result by similarity value.

A sequential display unit V37 receives the sort result by similarity value from the image sort unit V36 and the slide-condition setting value from the slide-condition setting unit V34. When the similarity-value variation function information of the slide-condition setting value makes no specification of similarity-value variation function, the sequential display unit V37 sequentially displays the images from the key image according to the sort result by similarity value, to perform a slide show.

When the similarity-value variation function information of the slide-condition setting value makes some specification of similarity-value variation function, the sequential display unit V37 sequentially displays the images having the similarity values closest to a value of similarity-value variation function (hereinafter referred to as "comparison similarity value"), to perform a slide show. In other words, the similarity-value variation function is a function determining an order of displaying the images.

Moreover, the sequential display unit V37 performs a key-image change. For performing this key-image change, the unit V37 adopts an image selected among a plurality of images during the slide show as a new key image with which the key image is replaced at the change timing defined by the key-image change information in the slide-condition setting value, and makes the similarity-value calculation unit V35 calculate respective similarity values of a plurality of images based on the changed key image. At this time, an image for the new key image is selected on the basis of the selection criterion defined by the key-image selection information of the slide-condition setting value.

Not shown in FIG. 21, a whole control unit exists to control the operations of the feature-value extraction unit V31, the slide-condition setting unit V34, the similarity-value calculation unit V35, the image sort unit V36 and the sequential display unit V37.

There is the following relation between FIG. 21 and FIGS. 1 and 2. The feature-value extraction V31 corresponds to the CPU 201 of the computer 1 for executing a feature-value extraction subroutine as discussed later in detail. The image-data store unit V32 corresponds to the flexible disk drive 5, hard disk drive 6 and the CD-ROM drive 9. The feature-value store unit V33 corresponds to the flexible disk drive 5 and the hard disk drive 6, and the RAM 204 of the computer 1. Further, the image data obtained from the image-data store unit V32 can be once loaded into the RAM 204.

The slide-condition setting unit V34 corresponds to the CPU 201 of the computer 1 for executing a slide-show setting subroutine as discussed later in detail. As input means for setting the slide condition in the slide-condition setting unit V34, the keyboard 3, the mouse 4 and the like are used. As a memory buffer of the slide-condition setting unit V34, the RAM 204, the hard disk drive 6 or the like is used.

The similarity-value calculation unit V35, the image sort unit V36 and the sequential display unit V37 correspond to the CPU 201 of the computer 1 for executing a slide-show execution subroutine as discussed later in detail. The feature values of each image loaded by the similarity-value calculation unit V35, the similarity values of each image obtained by the unit V35 and the sort result by similarity value obtained by the image sort unit V36 are temporarily stored in the internal RAM 204, the external hard disk drive 6 (hard disk therein) and the like, being processed by the CPU 201 or propagated to subsequent stages. To make a request for ending the slide show to the sequential display unit V37, the keyboard 3, the mouse 4, the microphone 11 and the like are used.

The whole control unit corresponds to the CPU 201 of the computer 1 for performing the main routine as discussed later in detail. Further, the display 2 is used to display a menu, the speaker 10 is used to guide the menu, and the keyboard 3, the mouse 4 and the microphone 11 are used to select the menu.

Figure 22:
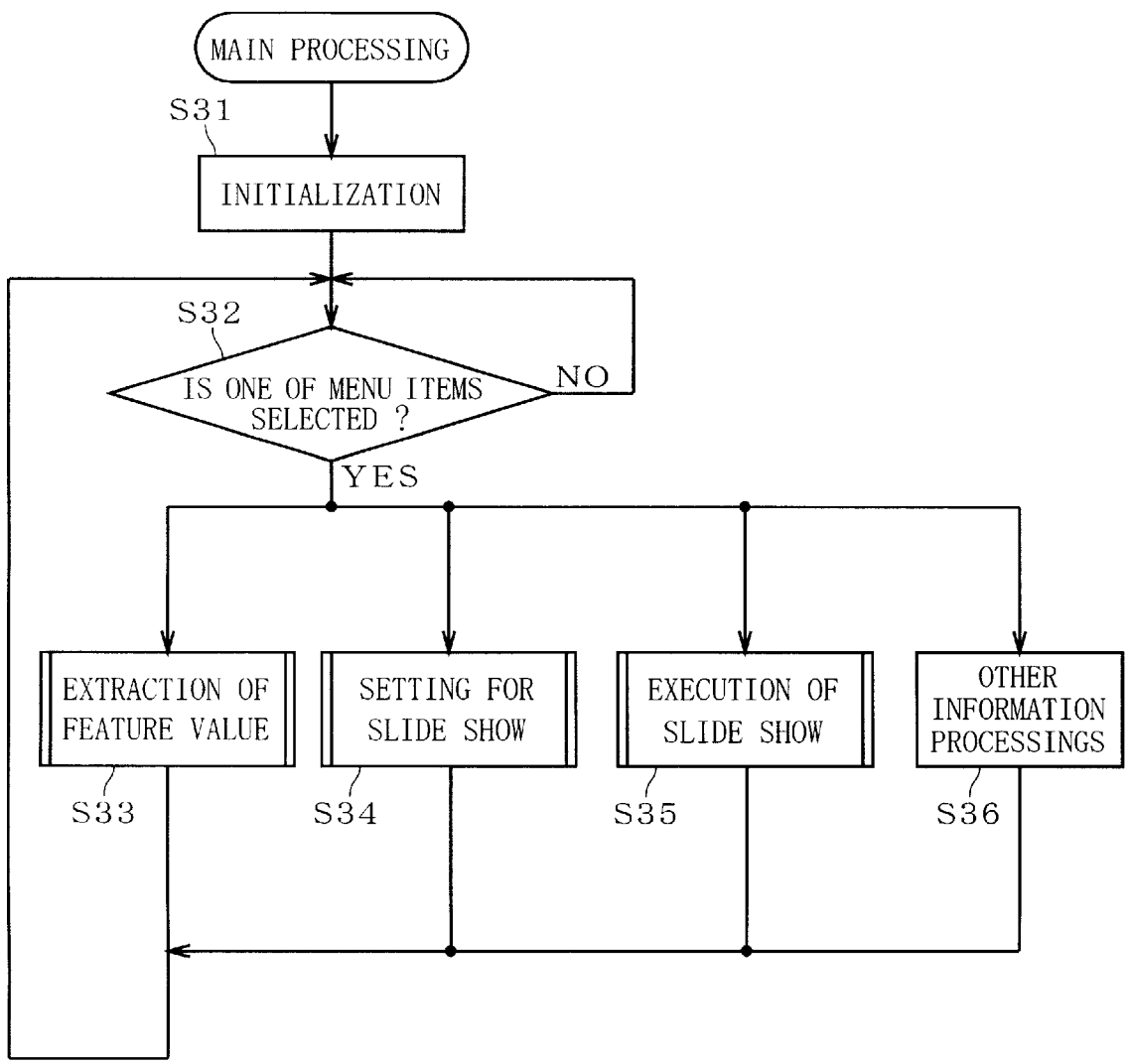
FIG. 22 is a flow chart showing a main operation flow of the system as an image sequential display apparatus.

FIG. 22 is a flow chart showing a main routine of a program for making the system of FIGS. 1 and 2 work as an image sequential display apparatus. The main routine is performed under the control of the whole control unit.

Referring to FIG. 22, in the step S31, setting of default values and initialization such as clearing of execution history, which are usual processings in execution of a program, are performed. In the step S32, a menu is displayed on the display 2 and a voice for guiding is outputted from the speaker 10 as required, inviting the user to select a subroutine to be executed from the menu.

In the step S32, a menu selection is performed, which is followed by the step S33 when a feature-value extraction subroutine is selected, the step S34 when a slide-show setting subroutine is selected, the step S35 when a slide-show execution subroutine and the step S36 when one of other subroutines is selected.

After executing the feature-value extraction subroutine in the step S33, the slide-show setting subroutine in the step S34, the slide-show execution subroutine in the step S35 and other subroutines in the step S36, the step S32 is executed again.

Figure 23:
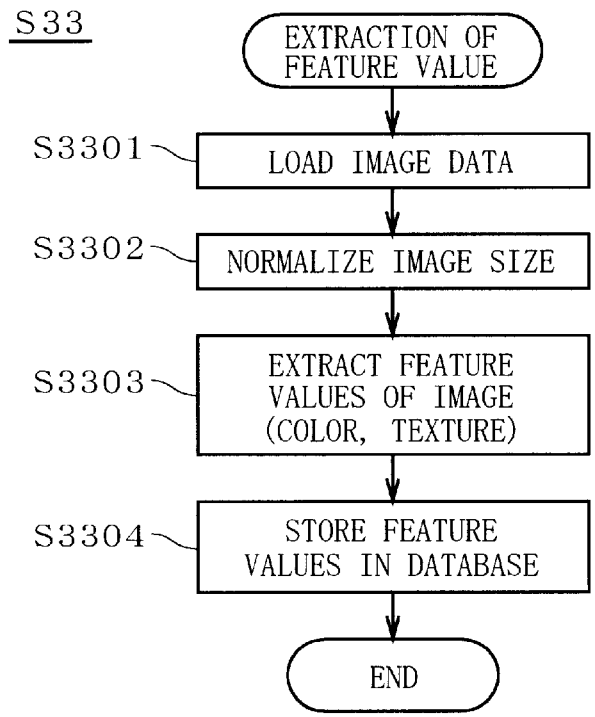
FIG. 23 is a flow chart showing a flow of calculation of feature values.

FIG. 23 is a flow chart showing a procedure of the feature-value extraction subroutine in the step S33 shown in FIG. 22.

Referring to FIG. 23, in the step S3301, the feature-value extraction unit V31 loads all of the image data to be retrieved from the image database of the image-data store unit V32.

In the step S3302, the feature-value extraction unit V31 normalizes the size of image indicated by each of the loaded image data.

In the step S3303, the feature-value extraction unit V31 extracts the feature values of each image normalized in the step S3302.

As one of the feature values, there is a feature value of texture. The feature value of texture can be obtained as follows. A Fourier spectrum image is generated by Fourier transform on the basis of the image data and the spectrum image is analyzed to extract the periodicity of image as a feature value. Other than the above, there are various feature values of texture such as fractal dimension and variance of fractal dimension.

As one of other feature values, there is a feature value of color. The feature value of color can be obtained as follows. By converting the RGB value of each pixel into an HSV value, a histogram of HSV (hue, saturation and value) and the average value of HSV values of all the pixels are extracted as the feature value of color. Other than the HSV value, HLS value, XYZ value, L*a*b* value, L*u*v* value and the like may be used. Further, there are the feature values on brightness and contrast other than those of texture or color.

In the step S3304, the feature-value extraction unit V31 stores the feature values of each image obtained in the step S3303 into the image database of the feature-value store unit V33.

Thus, the feature values of each image are obtained by the feature-value extraction unit V31.

Figure 24:
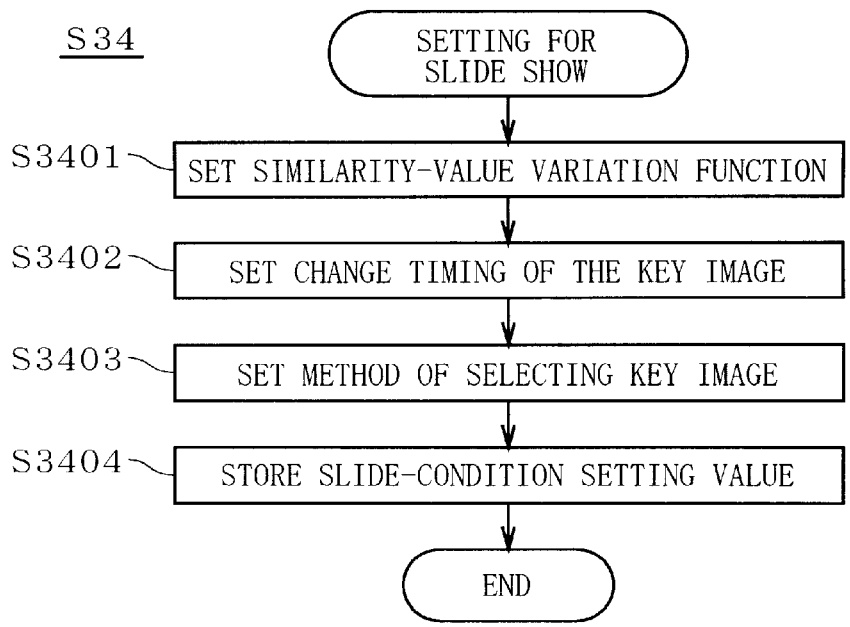
FIG. 24 is a flow chart showing a flow of setting a slide show.

FIG. 24 is a flow chart showing a procedure of a slide-show setting subroutine. "Key image" in FIG. 24 may be regarded as "key image data".

Referring to FIG. 24, in the step S3401, the slide-condition setting unit V34 sets presence of specification on similarity-value variation function and similarity-value variation function information defining functions in a case of presence on the basis of user's specification. The following three are typical specifications of similarity-value variation function by the user:

(A1) No specification of function:

This indicates a display in the order sorted by similarity value.

(A2) Specification of proportional function:

$$f(i)=ki (k: \text{constant } (>0), i: \text{order of display})$$

is used as the similarity-value variation function, and while the variable i is changed as i=1, 2, . . . , an image having the similarity value closest to f(i) is specified for display.

The proportional function f(i) monotonously increases. Therefore, when the proportional function f(i) is set as the similarity-value variation function, the images are displayed in such an order as the similarity value to the key image degrades in a constant proportion. That can resolve the inconvenience that the same image are repeatedly displayed in a slide show when there exist a plurality of identical images among images to be displayed in the slide show.

(A3) Specification of fluctuation function:

$$g(i)=ki+\sin(ai) (k: \text{constant } (>0), a: \text{constant}, i: \text{order of display})$$

is used as the similarity-value variation function, and while the variable i is changed as i=1, 2, . . . , an image having the similarity value closest to g(i) is specified for display.

The fluctuation function g(i) gradually increases, fluctuating. Therefore, when the fluctuation function g(i) is set as the similarity-value variation function, a display is made, alternating images greatly similar to the key image and those little similar thereto, in such an order as the similarity value to the key image roughly degrades in a gradual manner.

Further, in the step S3401, there may be a case where the constants (k, a and the like) in the similarity-value variation function can be set by user's specification and is included in the similarity-value variation function information.

Next, in the step S3402, the slide-condition setting unit V34 sets key-image change information defining the change timing of the key image on the basis of user's specification. The following two are typical specifications of key-image change timing.

(B1) A case where a specified number of images (the number of changes of the key images) from the setting (or change) of the key image are displayed (setting of the number of display images).

(B2) A case where an image having the similarity value away from the key image by a specified similarity-value distance (key-image change distance) is displayed (setting of similarity-value distance).

Further, a value defining the number of display images in the case of B1 and the similarity-value distance in the case of B2 is set as the key-image change information at the same time. The number of display images and the similarity-value distance may be set by user's specification.

After that, in the step S3403, the slide-condition setting unit V34 sets the key-image selection information defining methods of selecting the key image on the basis of user's specification. The following two are typical specifications of method of selecting the key image.

(C1) Selection of current image as a new key image (current key image):
This allows a display of images similar to a new key image every change of the key image in execution of slide show.

(C2) Random selection of key image (random key image):
This is effective when it is desired to select a key image having no relation to an immediately preceding displayed image.

Finally, in the step S3404, the slide-condition setting unit V34 stores the slide-condition setting value including the information set in the steps S3401 to S3403 into a memory buffer. Further, there may be a case where setting of the key image at the start is also performed in execution of the step S3303 and information defining the key image at the start is included in the key-image selection information.

Figure 25:
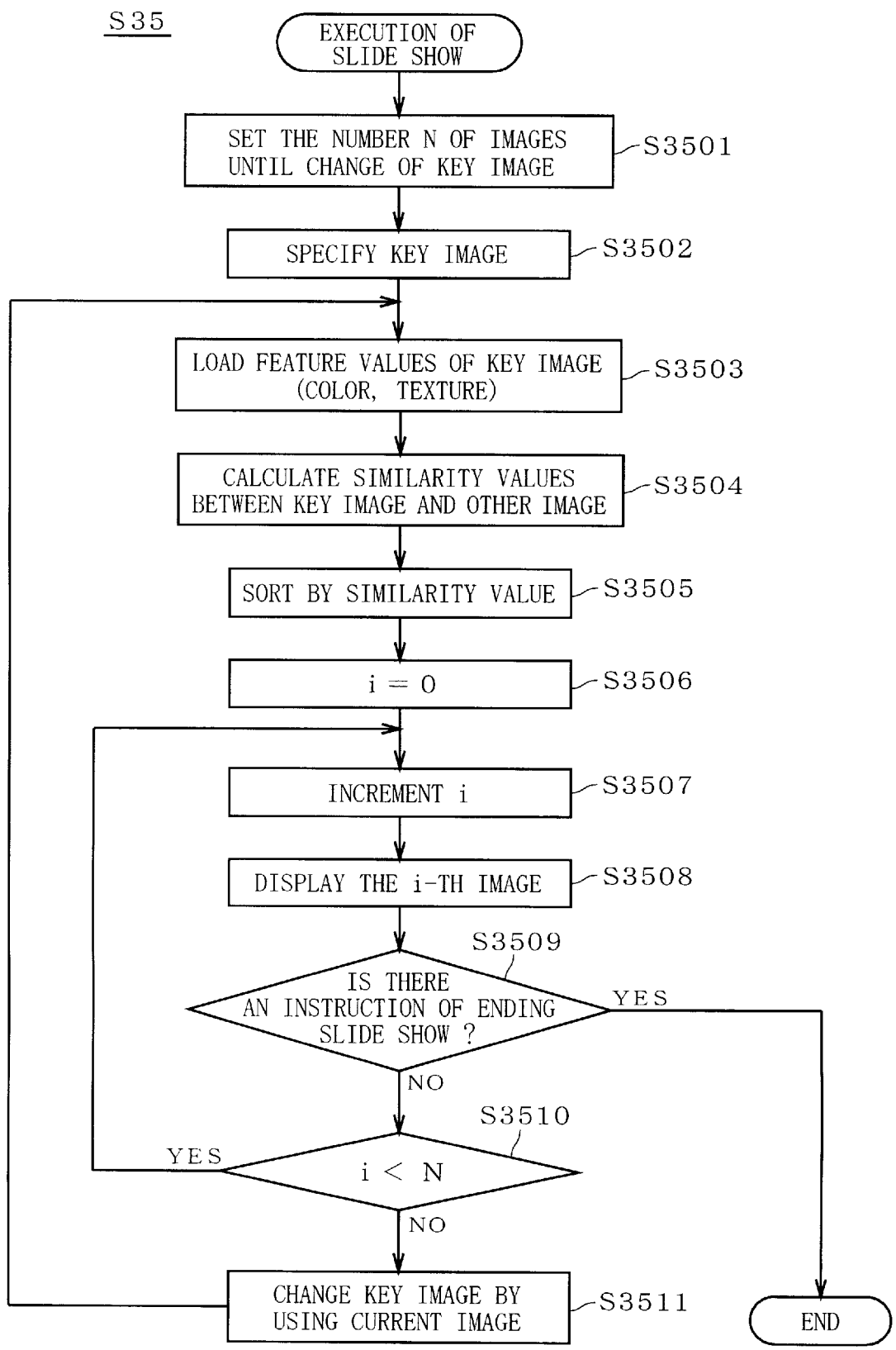
FIGS. 25 and 26 are flow charts each showing a flow of performing a slide show.

FIG. 25 is a flow chart showing the first procedure of a slide-show execution subroutine. FIG. 25 shows a procedure in a case where the slide-condition setting unit V34 sets a slide-condition setting value including various pieces of information defined on the basis of no specification of similarity-value variation function (A1), specification of key-image change timing made by setting of "the number of display images" (B1) and specification of method of selecting the key image based on "the current key image" (C1). Further, in FIG. 25, "key image" may be understood as "key image data" and "image" as "image data".

Referring to FIG. 25, in the step S3501, the sequential display unit V37 recognizes the number of changes as a key-image switching variable N on the basis of the key-image change information of the slide-condition setting value obtained from the slide-condition setting unit V34.

In the step S3502, the sequential display unit V37 sets a key image at the start. The setting of the key image at the start may be made on the basis of the slide-condition setting value when the key image at the start is defined in the key-image selection information of the slide-condition setting value, made by the sequential display unit V37 itself at random, or made by inviting a user to specify the key image.

In the step S3503, the similarity-value calculation unit V35 loads the feature values of the key image stored in the image database of the feature-value store unit V33.

In the step S3504, the similarity-value calculation unit V35 calculates the similarity values, which serves as a measure of similarity, of each image to the key image on the basis of the result of comparison between the feature values of the key image and those of the objective image other than the key image while sequentially loading the feature values of the image from the feature-value store unit V33. The simplest method is to obtain a sum of squares of the difference between the feature values of the two images as the similarity value.

In the step S3505, the image sort unit V36 obtains a sort result by similarity value in a form of list of data of objective images which are sorted in descending order by similarity value on the basis of the similarity-value calculation result obtained by the similarity-value calculation unit V35.

After that, in the step S3506, the sequential display unit V37 resets a count value i for the number of display images into "0".

Subsequently, in the step S3507, the sequential display unit V37 increments the counter value i by "1", and in the step S3508, the i-th image is displayed.

In the step S3509, the sequential display unit V37 confirms whether there is an instruction of ending the slide show or not, and if the instruction is present (YES), the unit V37 terminates the slide-show execution subroutine and if no instruction (NO), the processing goes to the subsequent step S3510. As the instruction of ending the slide show, a predetermined key operation (an input of ESC key, simultaneous inputs of Control key and a key of alphabet "C" and so on) is made by a user and so on.

In the step S3510, a comparison between the count value i and the key-image switching variable N is made to judge if i<N. If i<N (YES), the processing goes back to the step S3507 and if i≧N (NO), the processing goes to the step S3511.

From then on, the steps S3507 to S3510 are repeated until the instruction of ending the slide show is given in the step S3509 or it is judged that i≧N in the step S3510, and the unit V37 displays the i-th image in the step S3508 while incrementing the count value i, to perform the slide show.

Thus, since the sequential display unit V37 sequentially displays images based on the sort result by similarity value, the unit V37 makes a sequential display of the images in descending order of similarity values to the key image, to improve a retrieval efficiency. Especially, this is effective when it is desired to retrieve an image similar to the key image.

When it is judged that i≧N in the step S3510, the current (i-th) image becomes a new key image in the step S3511 and then the processing goes back to the step S3503.

From then on, in the steps S3503 to S3510, the similarity-value calculation, the sorting by similarity value and the slide display are performed on the basis of the new key image.

Therefore, if the number of changes is set at the number in which no possibility of displaying an image with no similarity to the key image (or the similarity to the key image is almost kept), images with similarity (much correlation) to the latest key image are always sequentially displayed and retrieval efficiency is improved as compared with a case where the key image is fixed and images with little similarity are sequentially displayed at random in time.

Figure 26:
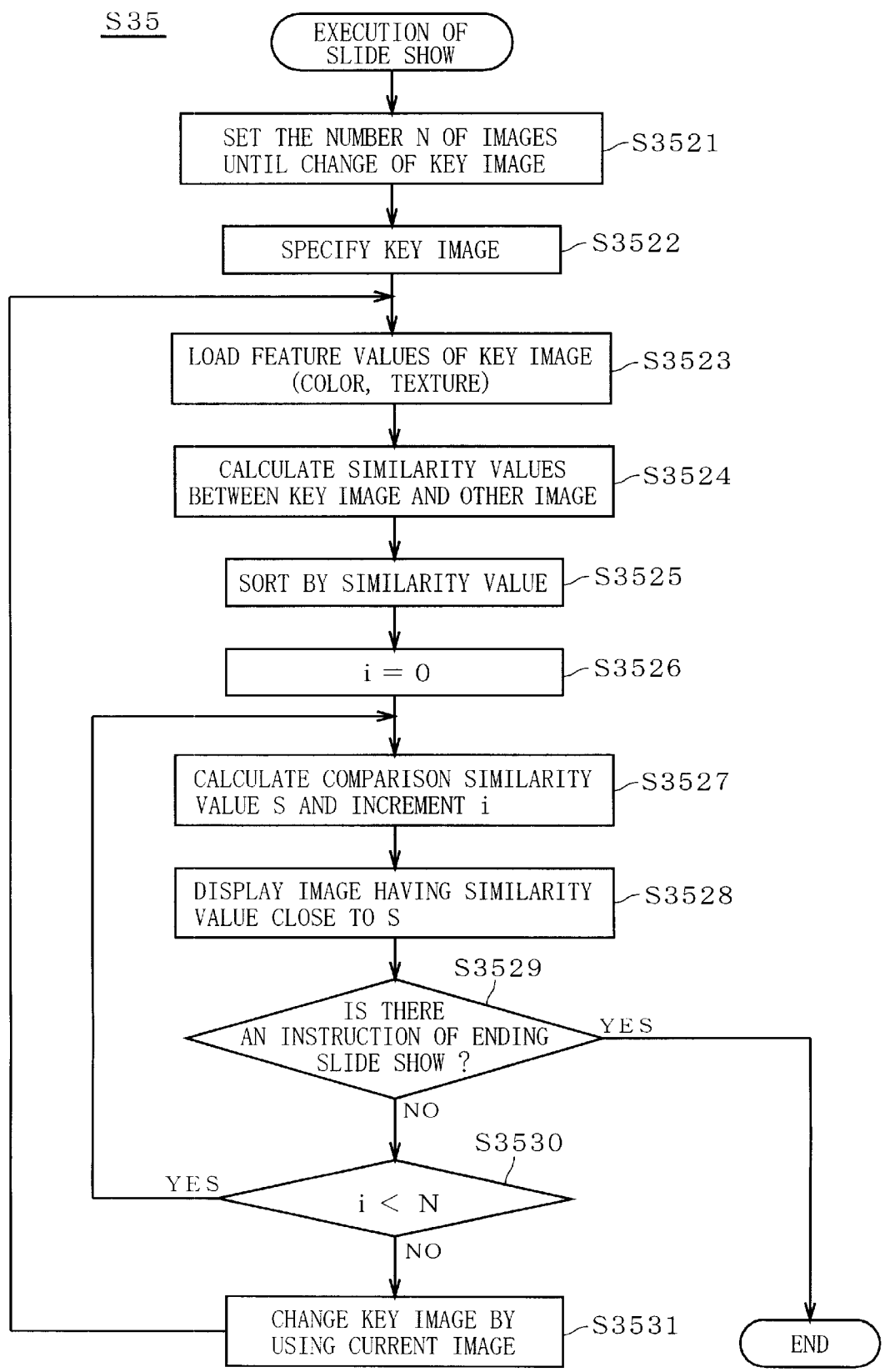

FIG. 26 is a flow chart showing the second procedure of the slide-show execution subroutine. FIG. 26 shows a procedure in a case where the slide-condition setting unit V34 sets a slide-condition setting value including various pieces of information defined on the basis of specification of similarity-value variation function f(i) or g(i) (A2 or A3), specification of key-image change timing made by setting of "the number of display images" (B1) and specification of method of selecting the key image based on "the current key image" (C1). Further, in FIG. 26, "key image" may be understood as "key image data" and "image" as "image data".

Referring to FIG. 26, in the step S3521, the sequential display unit V37 recognizes the number of changes as the key-image switching variable N on the basis of the key-image change information of the slide-condition setting value obtained from the slide-condition setting unit V34.

In the step S3522, like in the step S3502, the sequential display unit V37 sets a key image at the start.

In the step S3523, the similarity-value calculation unit V35 loads the feature values of the key image stored in the image database of the feature-value store unit V33.

In the step S3524, like in the step S3504, the similarity-value calculation unit V35 calculates the similarity values of each image to the key image on the basis of the result of comparison between the feature values of the key image and those of the image other than the key image.

In the step S3525, the image sort unit V36 obtains the sort result by similarity value of data of images sorted in ascending order by similarity value on the basis of the similarity-value calculation result obtained by the similarity-value calculation unit V35.

After that, in the step S3526, the sequential display unit V37 resets the count value i into "0".

Subsequently, in the step S3527, the sequential display unit V37 increments the counter value i by "1", obtains a value of similarity-value variation function at the incremented count value i and recognizes the value as a comparison similarity value S.

In the step S3528, the sequential display unit V37 displays an image having a similarity value closest to the comparison similarity value S among the images sorted according to the similarity values.

After that, in the step S3529, the sequential display unit V37 confirms whether there is an instruction of ending the slide show or not, like in the step S3509, and if the instruction is present (YES), the unit V37 terminates the slide-show execution subroutine and if no instruction (NO), the processing goes to the subsequent step S3530.

In the step S3530, a comparison between the count value i and the key-image switching variable N is made to judge if i<N. If i<N (YES), the processing goes back to the step S3527 and if i≧N (NO), the processing goes to the step S3531.

From then on, the steps S3527 to S3530 are repeated until the instruction of ending the slide show is given in the step S3529 or it is judged that i≧N in the step S3530, and the unit V37 sequentially displays the image having the similarity value closest to the comparison similarity value S in the step S3528 while obtaining the comparison similarity value S, to perform the slide show.

Thus, since the sequential display unit V37 sequentially displays the image having the similarity value closest to the comparison similarity value S, it is possible to sequentially display images according to variation specific to the similarity-value variation function.

Figure 27:
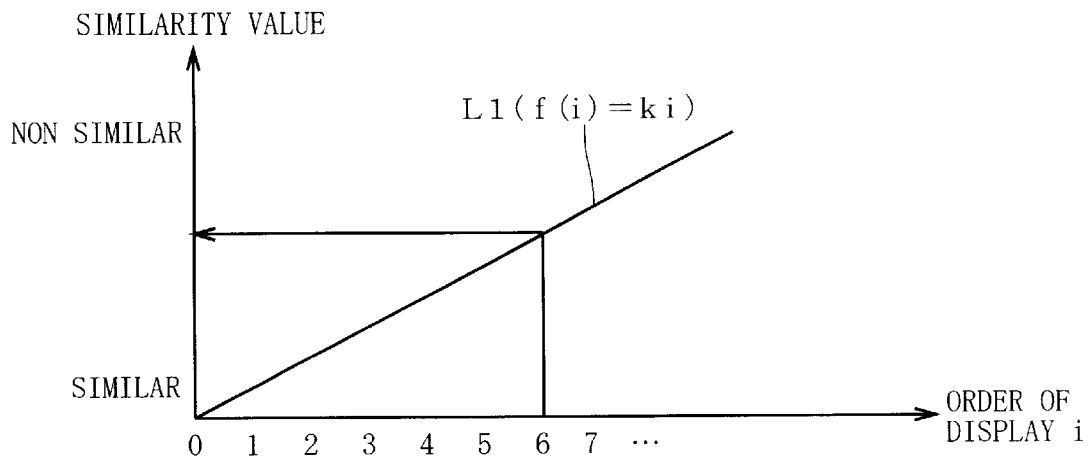
FIG. 27 is a graph showing an example of similarity-value variation function.
Figure 28:
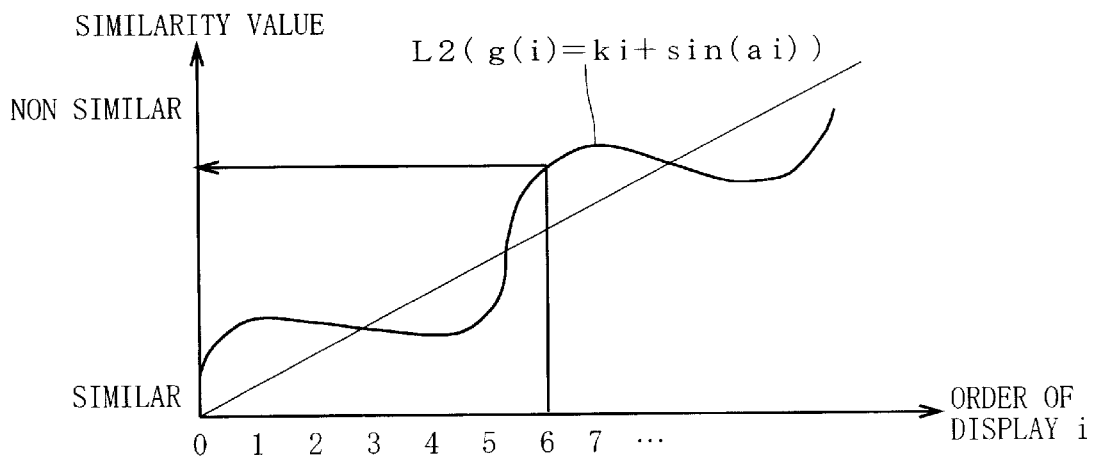
FIG. 28 is a graph showing another example of similarity-value variation function.

FIGS. 27 and 28 are graphs showing respective examples of proportional function f(i) and fluctuation function g(i) which are similarity-value variation functions. As indicated by a graph L1 in FIG. 27, the proportional function $$f(i)=ki$$

increases in proportion to the count value i. Therefore, as a slide display with respect to the same key image proceeds, similarities between sequentially-displayed images and the key image are monotonously degraded.

As indicated by a graph L2 in FIG. 28, the fluctuation function $$g(i)=ki\ \sin(ai)$$

gradually increases with irregularly variation with respect to the count value i. Therefore, as a slide display with respect to the same key image proceeds, consecutively displaying images having high similarity values and suddenly displaying an image having a similarity value largely different from that of the preceding image, similarity-value distances between sequentially-displayed images and the key image are gradually widened.

When it is judged that i≧N in the step S3530, the current (i-th) image becomes a new key image in the step S3531 and then the processing goes back to the step S3523.

From then on, in the steps S3523 to S3530, the similarity-value calculation, the sorting by similarity value, calculation of the comparison similarity value S and the slide display are performed on the basis of the new key image.

Therefore, if the number of changes is set at the number in which no possibility of displaying an image with no similarity to the key image (or the similarity to the key image is almost kept), images with similarity (much correlation) to the latest key image are always sequentially displayed and retrieval efficiency is improved as compared with a case where the key image is fixed and images with little similarity are sequentially displayed at random in time.

Though the flow charts of the slide-show execution subroutine of FIGS. 25 and 26 show cases where specification of key-image change timing is made by setting of the number of display images (B1), it is natural that a case where specification of key-image change timing is made by setting of the similarity-value distance (B2) is also executable.

In this case, the processings of the steps S3501 and S3521 of FIGS. 25 and 26 are changed into a processing in which the sequential display unit V37 recognizes the key-image change distance as key-image switching variable M on the basis of the key-image change information of the slide-condition setting value obtained from the slide-condition setting unit V34 and the processings of the steps S3510 and S3530 into a processing in which a comparison is made to judge whether a relation between a similarity value Si between the key image and the current image and the key-image switching variable M is Si<M or not and if Si<M (YES), the processing goes back to the step S3507 (S3527) and if Si≧M (NO), the processing goes to the step S3511 (S3531).

Thought the flow charts of the slide-show execution subroutine of FIGS. 25 and 26 show cases where specification of method of selecting the key image is based on a current key image (C1), it is natural that a case where specification of method of selecting the key image is based on the random key image (C2) is also executable.

In this case, the processings of the steps S3511 and S3531 of FIGS. 25 and 26 are changed into a processing in which an image selected at random becomes a new key image.

Further, though it is general that a whole program is stored when a slide-show execution program is stored in an external recording medium such as the flexible disk 51 and the CD-ROM 91, only part of the program (e.g., the key-image change routine through the step S3501, S3510 and S3511 (S3521, S3530 and S3531) may be stored into the external recording medium. In this case, other part of the program is written into the ROM 203 in advance and the programs are loaded from the ROM 203 and the external recording medium to be executed in execution of the slide-show execution program.

While the invention has been shown and described in detail, the foregoing description is in all aspects illustrative and not restrictive. It is therefore understood that numerous modifications and variations can be devised without departing from the scope of the invention.

What is claimed is:

1. An apparatus for comparing an objective image with a key image, comprising:
   a storage device storing data of said objective image and said key image; and
   a processor for extracting objective feature values of said objective image and key feature values of said key image, determining weighting factors automatically corresponding to types of feature values on the basis of the thus extracted key feature values, calculating similarity values corresponding to said types of feature values from said objective feature values and said key feature values, and obtaining a total similarity value from said weighting factors and said similarity values.

2. The apparatus according to claim 1, wherein
   said storage device stores a plurality of objective images, and
   said processor obtains said total similarity value of each of said plurality of objective images to said key image and extracts a predetermined number of objective images as images similar to said key image on the basis of the thus obtained total similarity value of each of said plurality of objective images.

3. The apparatus according to claim 1, wherein
   when all of said key feature values are lower than predetermined values, said processor sets the same weighting factor for all of said types of feature values.

4. The apparatus according to claim 1, further comprising:
   a display for displaying said weighting factors determined by said processor; and
   an input device for receiving instructions to correct said weighting factors determined by said processor.

5. An apparatus for comparing an objective image with a key image, comprising:
   a storage device storing data of a plurality of resized objective images and a plurality of resized key images obtained by resizing said objective image and said key image, respectively, wherein each of said plurality of resized objective images has a resolution different from one another and each of said plurality of resized key images has a resolution different from one another;
   an input device for receiving a specified resolution; and
   a processor for extracting objective feature values from one of said plurality of resized objective images and key feature values from one of said plurality of resized key images corresponding to said specified resolution received by said input device, and comparing said objective image with said key image on the basis of said objective feature values and said key feature values.

6. The apparatus according to claim 5, wherein
   said storage device stores a plurality of resized objective images obtained by resizing each of a plurality of objective images, and
   said processor compares each of said plurality of objective images with said key image on the basis of said objective feature values and said key feature values and extracts a predetermined number of objective images as images similar to said key image on the basis of the comparison result.

7. The apparatus according to claim 5, further comprising:
   an image processor for resizing both said objective image and said key image into a plurality of resolutions.

8. The apparatus according to claim 5, further comprising:
   a controller for displaying said plurality of resized objective images or said plurality of resized key images stored in said storage device on a display.

9. An apparatus for displaying images sequentially, comprising:
   a display capable of displaying images;
   a storage device storing data of a plurality of objective images and a key image;
   a processor for extracting feature values of said plurality of objective images and said key image, calculating a plurality of similarity values corresponding to said plurality of objective images on the basis of said feature values; and
   a controller for displaying said plurality of objective images sequentially on a one-by-one basis in accordance with said plurality of similarity values on said display as time elapses
   further comprising:
      an input device for receiving a specified similarity-value variation function,
      wherein said controller determines one of said plurality of objective images to be displayed on the basis of said similarity-value variation function received by said input device and said plurality of similarity values.

10. The apparatus according to claim 9, wherein
    said similarity-value variation function includes a function to display said plurality of objective images sequentially on a one-by-one basis in order of decreasing similarity value to said key image.

11. The apparatus according to claim 9, wherein
    said similarity-value variation function includes a function to display said plurality of objective images sequentially on a one-by-one basis so that said plurality of similarity values to said key image decrease at a constant rate.

12. The apparatus according to claim 9, wherein
    said similarity-value variation function includes a function to display said plurality of objective images sequentially on a one-by-one basis so that said plurality of similarity values to said key image vary at random.

13. A method in a data processing system for comparing an objective image with a key image, comprising the steps of:
    extracting objective feature values of said objective image and key feature values of said key image;
    determining weighting factors automatically corresponding to types of feature values on the basis of the thus extracted key feature values;
    calculating similarity values corresponding to said types of feature values from said objective feature values and said key feature values; and
    obtaining a total similarity value from said weighting factors and said similarity values.

14. A computer-readable medium having computer-executable instructions for performing the steps recited in claim 13.

15. A method in a data processing system for comparing an objective image with a key image, comprising the steps of:
    obtaining data of a plurality of resized objective images and a plurality of resized key images obtained by resizing said objective image and said key image, respectively, wherein each of said plurality of resized objective images has a resolution different from one another and each of said plurality of resized key images has a resolution different from one another;
    receiving a specified resolution; and extracting objective feature values from one of said plurality of resized objective images and key feature values from one of said plurality of resized key images corresponding to said specified resolution; and comparing said objective image with said key image on the basis of said objective feature values and said key feature values.

16. A computer-readable medium having computer-executable instructions for performing the steps recited in claim 15.

* * * * *